United States Patent
Rivas Molina et al.

(10) Patent No.: US 10,893,443 B2
(45) Date of Patent: Jan. 12, 2021

(54) NETWORK-BASED POLICY CONTROL FOR SIMULTANEOUS ACCESSES

(71) Applicant: Telefonaktiebolaget LM Ericsson (publ), Stockholm (SE)

(72) Inventors: Ignacio Rivas Molina, Madrid (ES); Susana Fernandez Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 22 days.

(21) Appl. No.: 16/309,681

(22) PCT Filed: Jun. 20, 2016

(86) PCT No.: PCT/EP2016/064167
§ 371 (c)(1),
(2) Date: Dec. 13, 2018

(87) PCT Pub. No.: WO2017/220109
PCT Pub. Date: Dec. 28, 2017

(65) Prior Publication Data
US 2019/0191336 A1   Jun. 20, 2019

(51) Int. Cl.
*H04W 4/00* (2018.01)
*H04W 28/26* (2009.01)
*H04L 12/28* (2006.01)
*H04L 12/813* (2013.01)
*H04L 29/08* (2006.01)
*H04W 28/24* (2009.01)

(52) U.S. Cl.
CPC ......... *H04W 28/26* (2013.01); *H04L 12/2803* (2013.01); *H04L 47/20* (2013.01); *H04L 67/1095* (2013.01); *H04W 28/24* (2013.01)

(58) Field of Classification Search
CPC . H04L 12/2803; H04L 41/0893; H04L 47/20; H04L 67/1095; H04W 28/24; H04W 28/26; H04W 76/11; H04W 76/20
See application file for complete search history.

(56) References Cited

U.S. PATENT DOCUMENTS

2012/0030331 A1*  2/2012  Karampatsis ......... H04W 24/02
                                                         709/223
2012/0185906 A1*  7/2012  Doets .................. H04L 65/1069
                                                         725/109
(Continued)

OTHER PUBLICATIONS

3GPP TS 23.203 v13.5.1; Technical Specification; 3rd Generation Partnership Project; Technical Specification Group Services and System Aspects; Policy and charging control architecture (Release 13)—Sep. 2015.
(Continued)

*Primary Examiner* — Minh Trang T Nguyen
(74) *Attorney, Agent, or Firm* — Baker Botts, LLP

(57) ABSTRACT

The present invention faces identifying resource allocation results when resource request and modifications occur in fast succession, and provides for associating at an AF each media component description transmitted to a PCRF with a media component instance identifier, associating at the PCRF each media component instance identifier with rule instance identifiers for control rules determined for each media component description, and associating at a PCEF each rule instance identifier with a control rule and with a bearer for which the control rule is to be installed or modified. Upon obtaining a resource allocation result for a bearer at the PCEF, determining and transmitting to the PCRF the rule instance identifier associated with the bearer and an affected control rule, determining and transmitting from the PCRF to the AF a media component instance identifier associated with the received rule instance identifier for the affected control rule, and identifying at the AF the media component description associated with the received media component instance identifier and for which the received resource allocation applies.

26 Claims, 12 Drawing Sheets

(56) References Cited

U.S. PATENT DOCUMENTS

| | | | |
|---|---|---|---|
| 2015/0131488 A1* | 5/2015 | Perez Martinez | H04L 12/1407 370/259 |
| 2016/0006571 A1* | 1/2016 | Teittinen | H04L 12/1407 455/405 |
| 2016/0142311 A1* | 5/2016 | Mann | H04L 45/02 709/242 |
| 2019/0357220 A1* | 11/2019 | Deng | H04M 15/00 |

OTHER PUBLICATIONS

3GPP TS 29.212 v13.3.0; Technical Specification; 3rd Generation Partnership Project; Technical Specification Group Core Network and Terminals; Policy and Charging Control (PCC); Reference points (Release 13)—Sep. 2105.

3GPP TS 29.214 v13.3.0; Technical Specification; 3rd Generation Partnership Project; Technical Specification Group Core Network and Terminals; Policy and Charging Control over Rx reference point (Release 13)—Sep. 2015.

3GPP TSG-CT WG3 Meeting #85; Osaka Japan; Change Request; Title: Authorization based on transfer policy; Source to WG: ZTE; Source to TSG: C3 (C3-161301)—May 23-27, 2016.

PCT International Search Report for International application No. PCT/EP2016/064167—dated Feb. 28, 2017.

PCT Written Opinion of the International Searching Authority for International application No. PCT/EP2016/064167—dated Feb. 28, 2017.

Examination Report issued by Intellectual Property India for Application No. 201817041388—dated Jul. 3, 2020.

\* cited by examiner

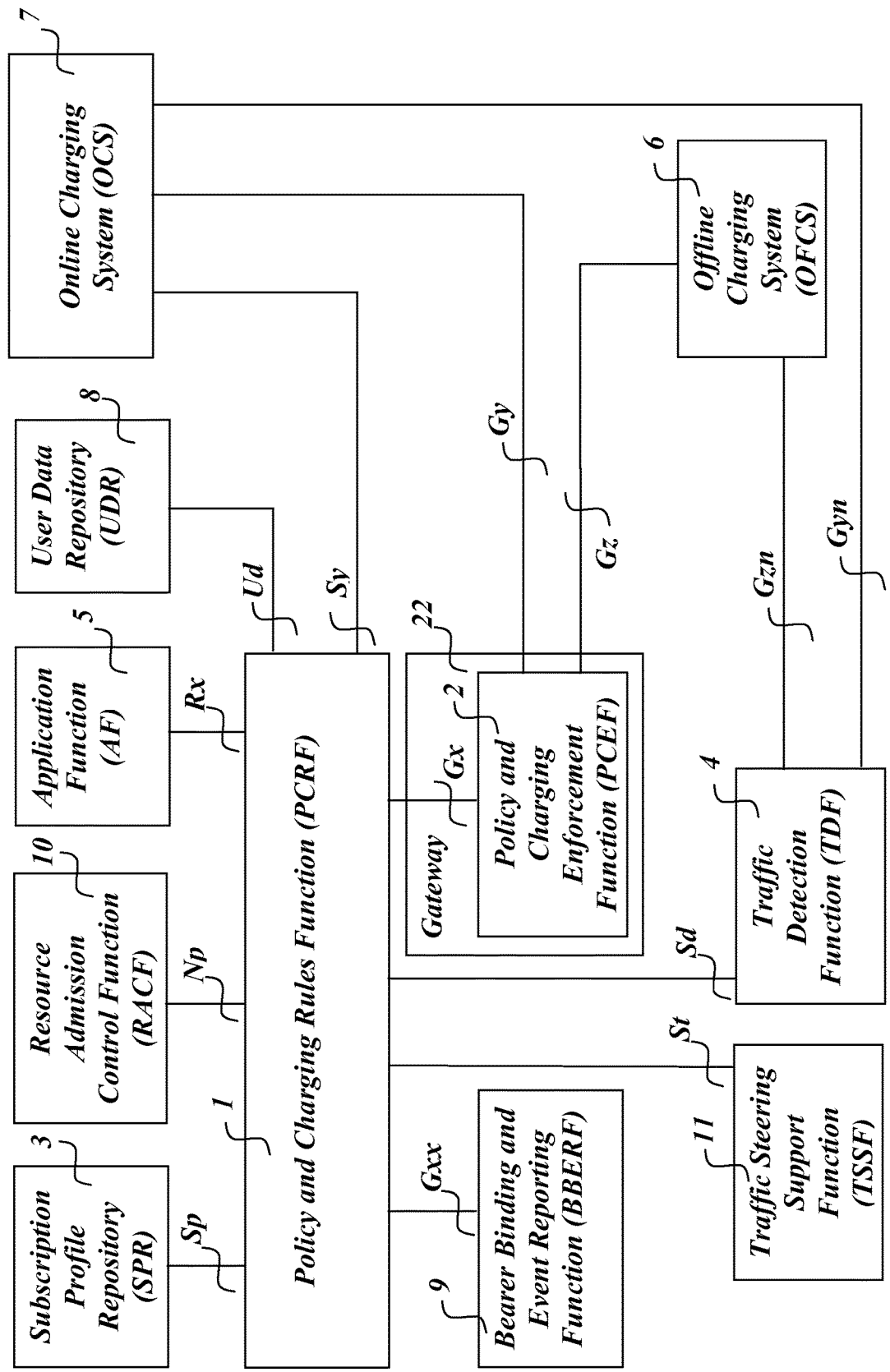
FIG. -1-

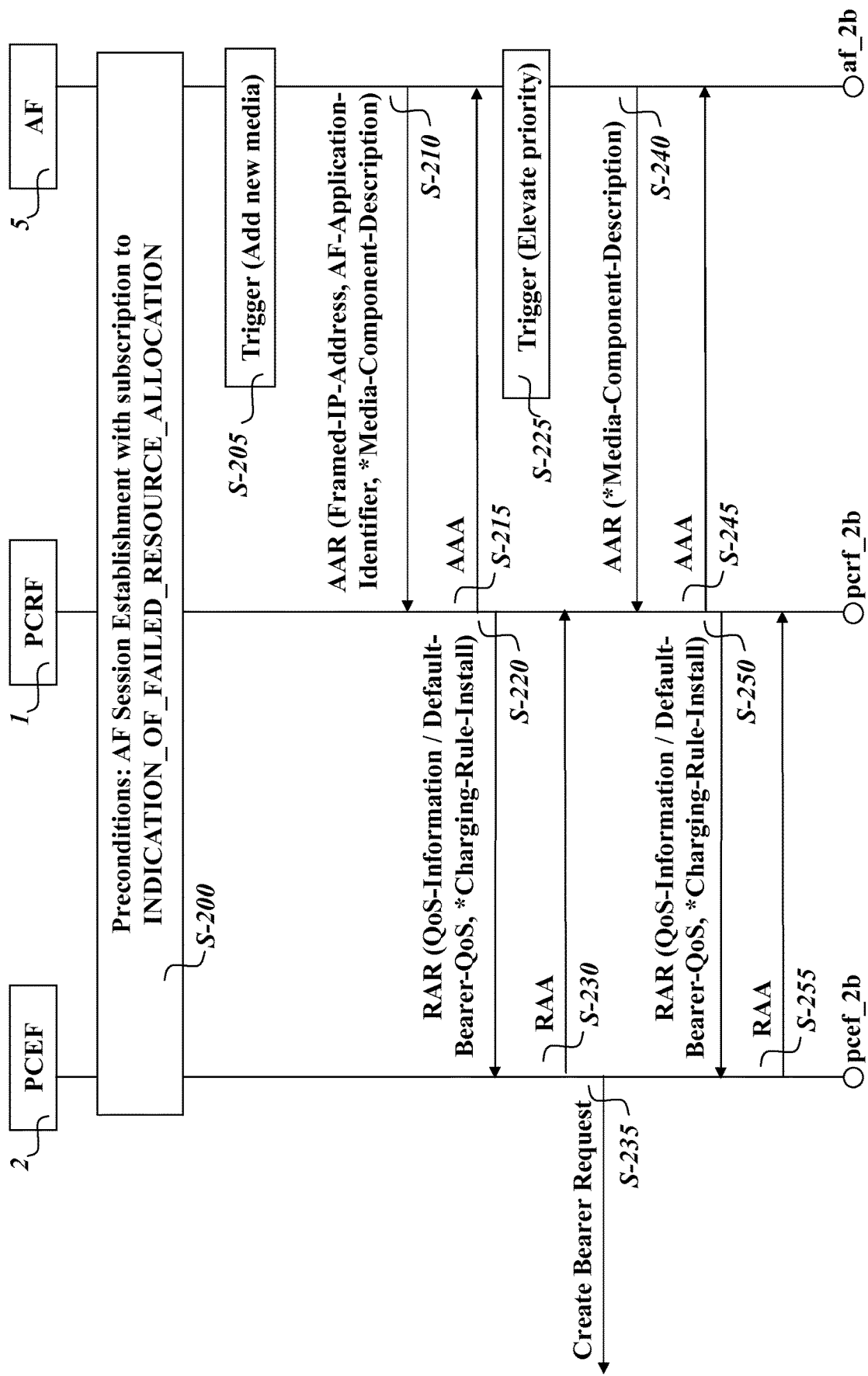
FIG. -2a-

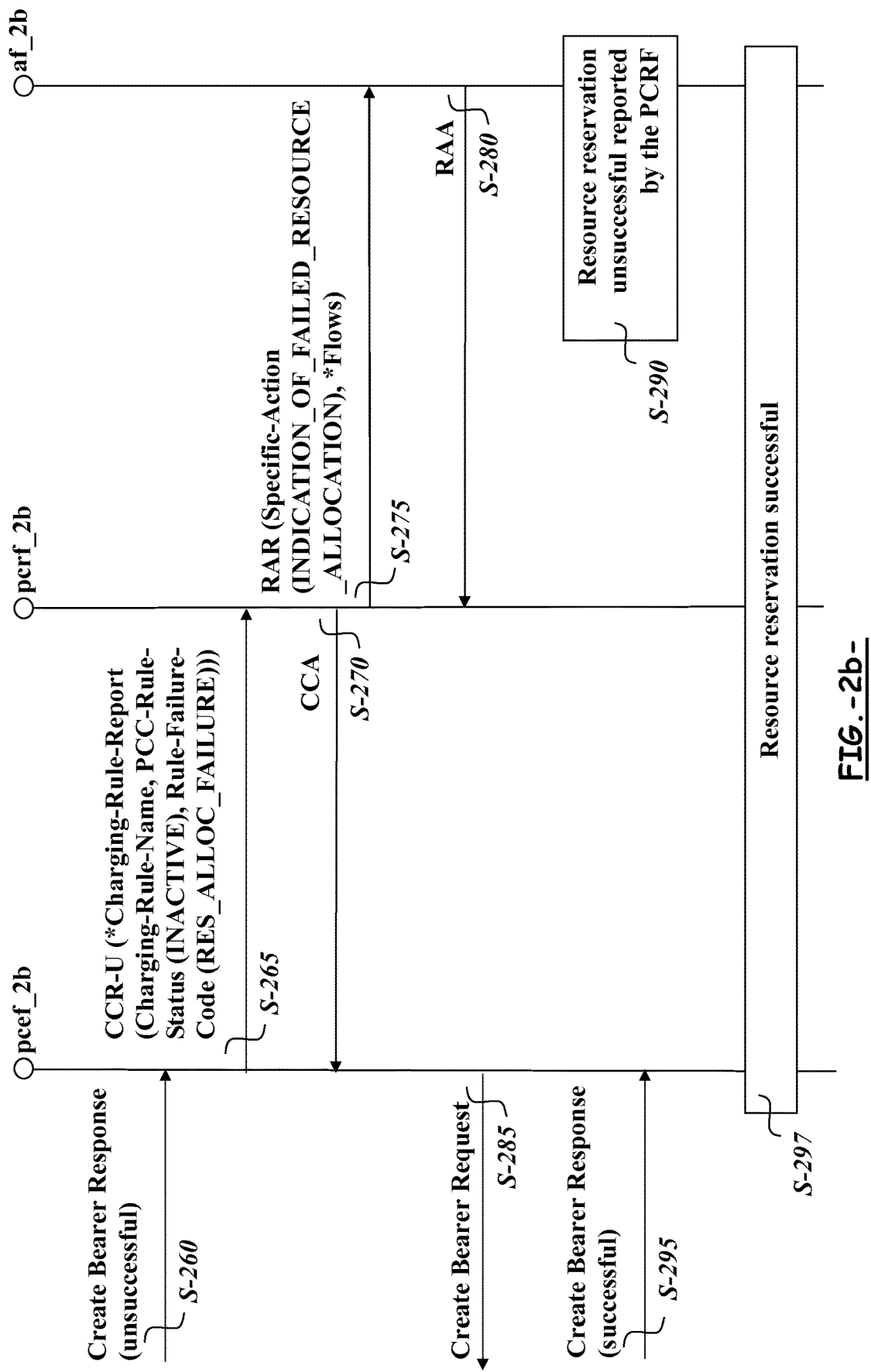
FIG. -2b-

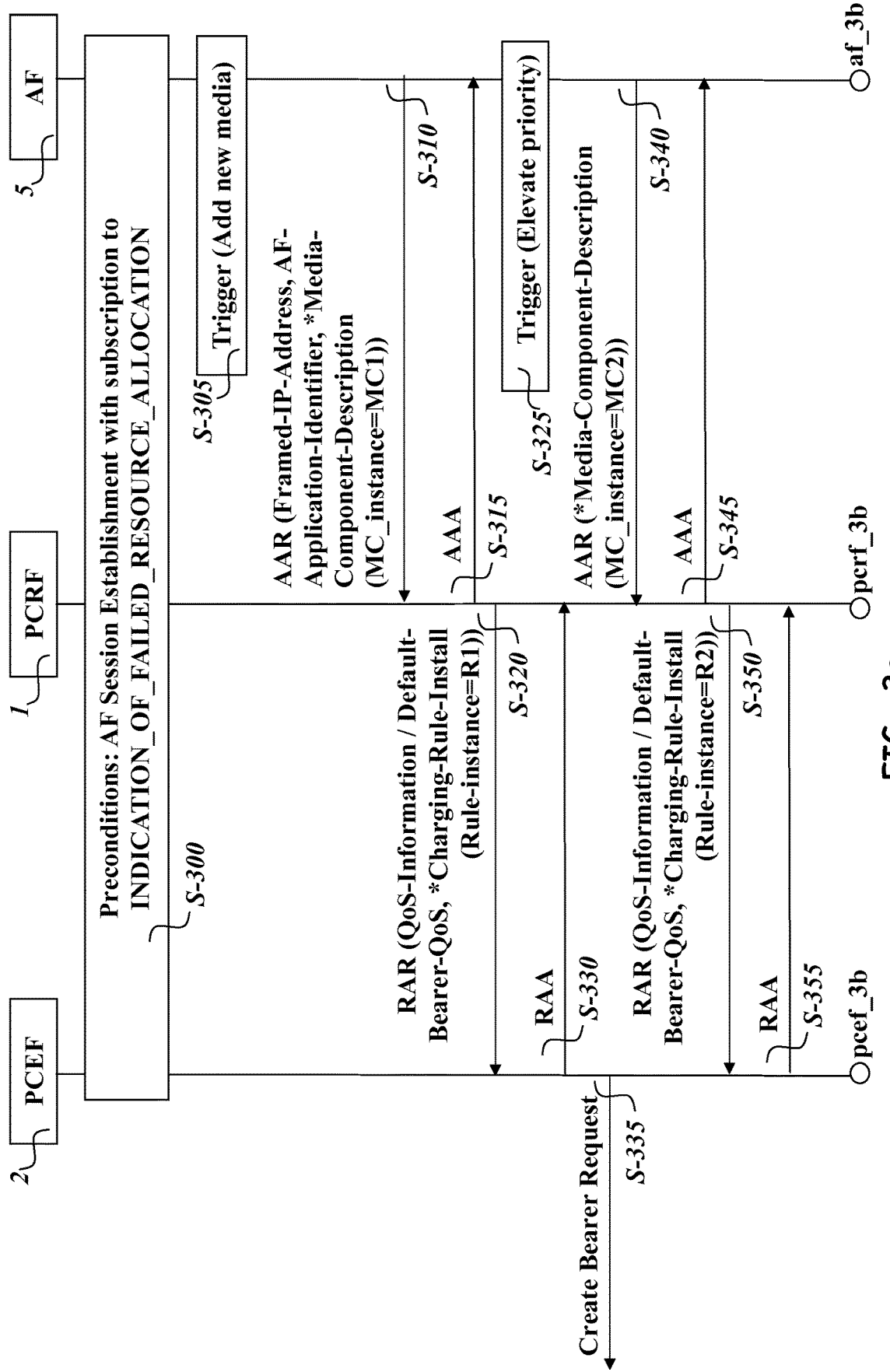
FIG. -3a-

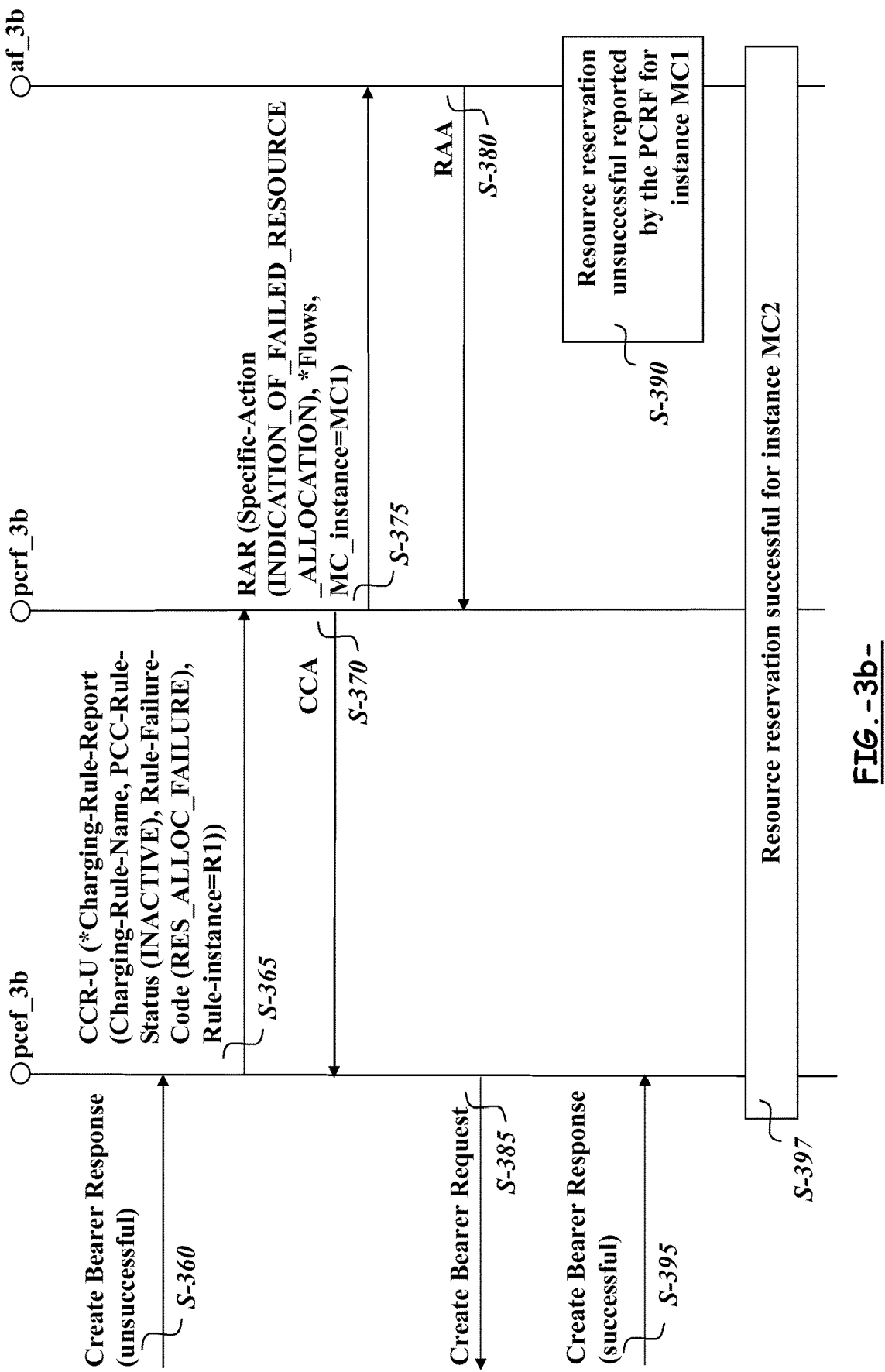
FIG. -3b-

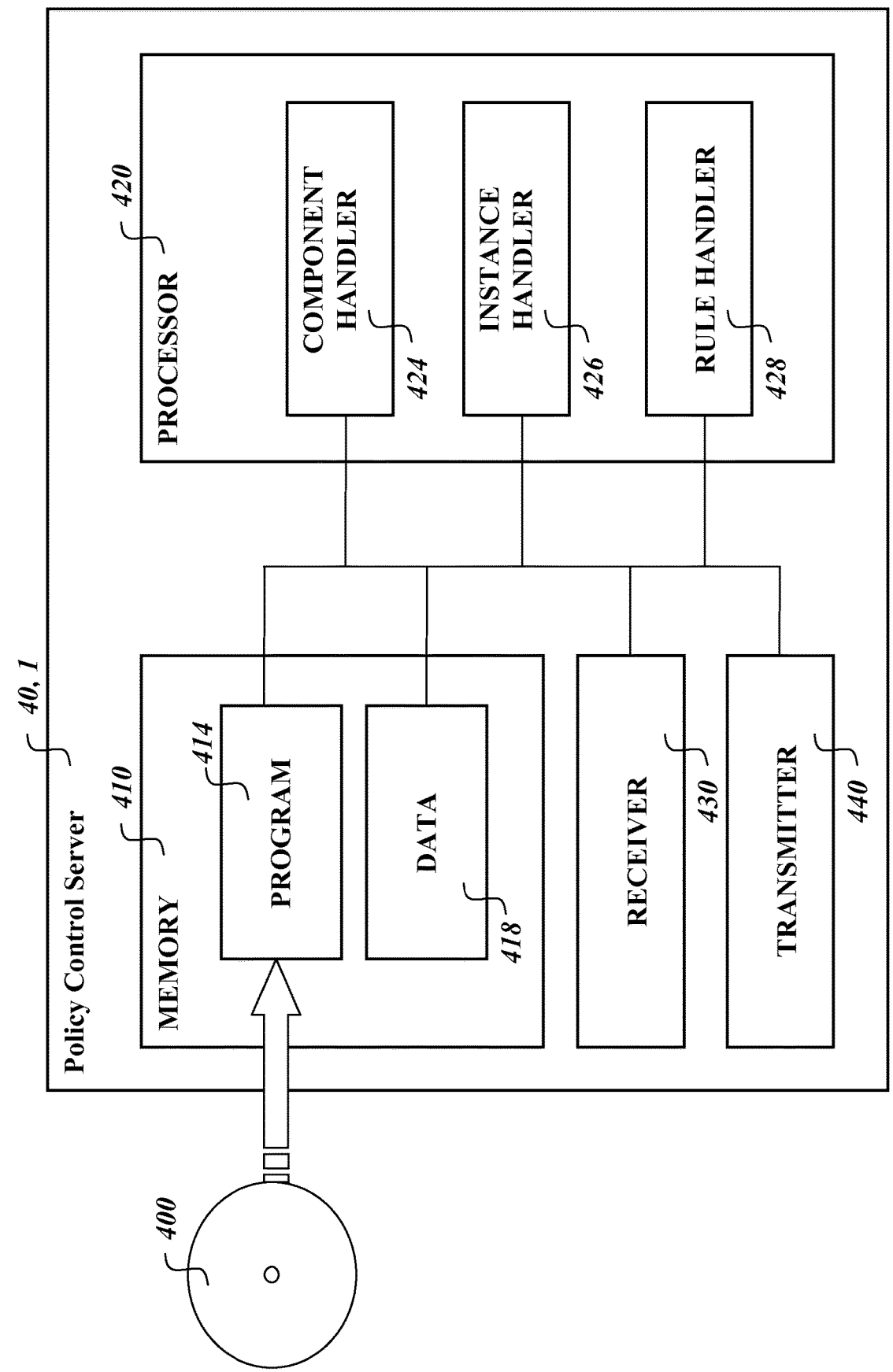
FIG. -4-

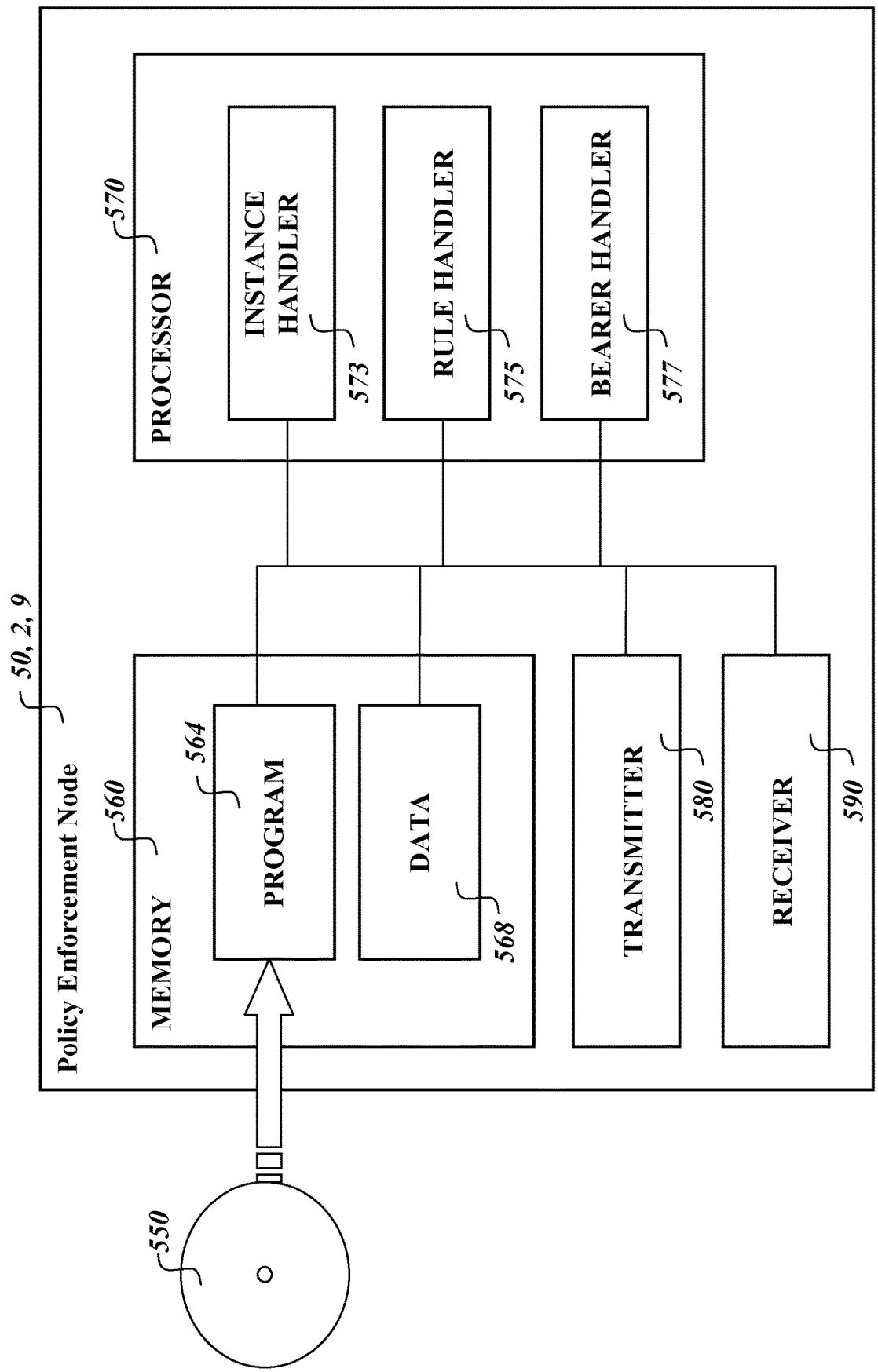
FIG. -5-

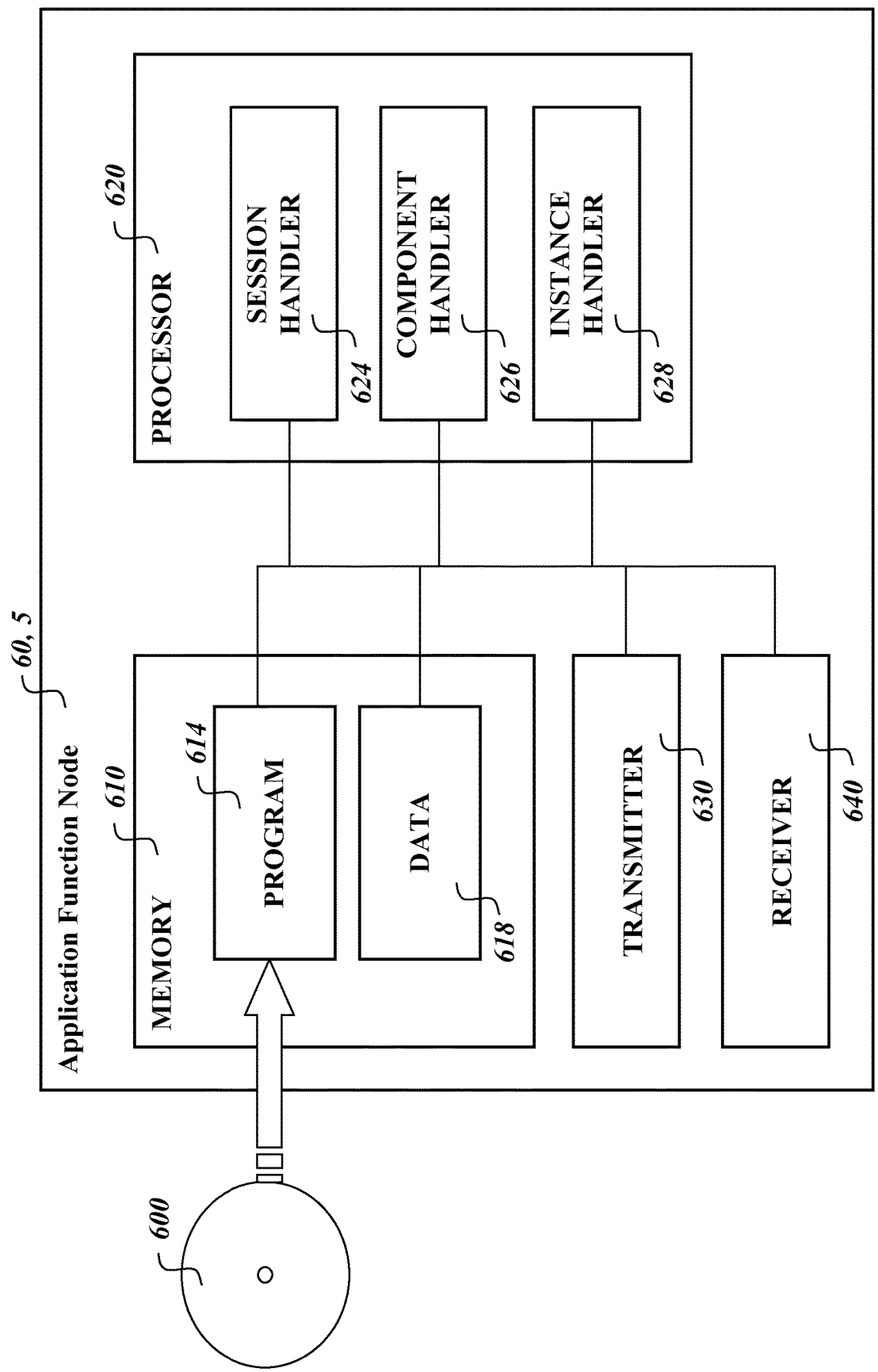
FIG.-6-

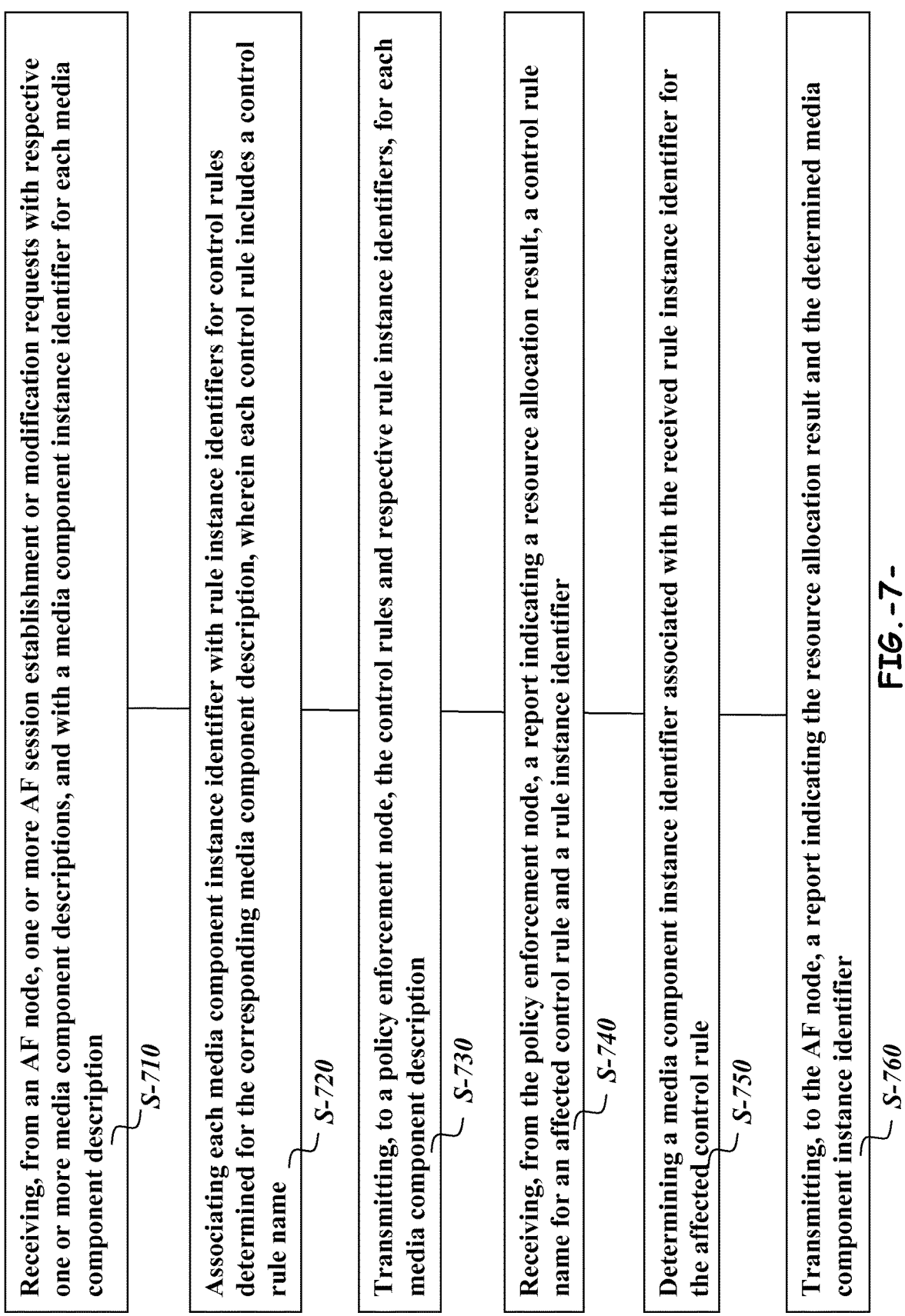
FIG. -7-

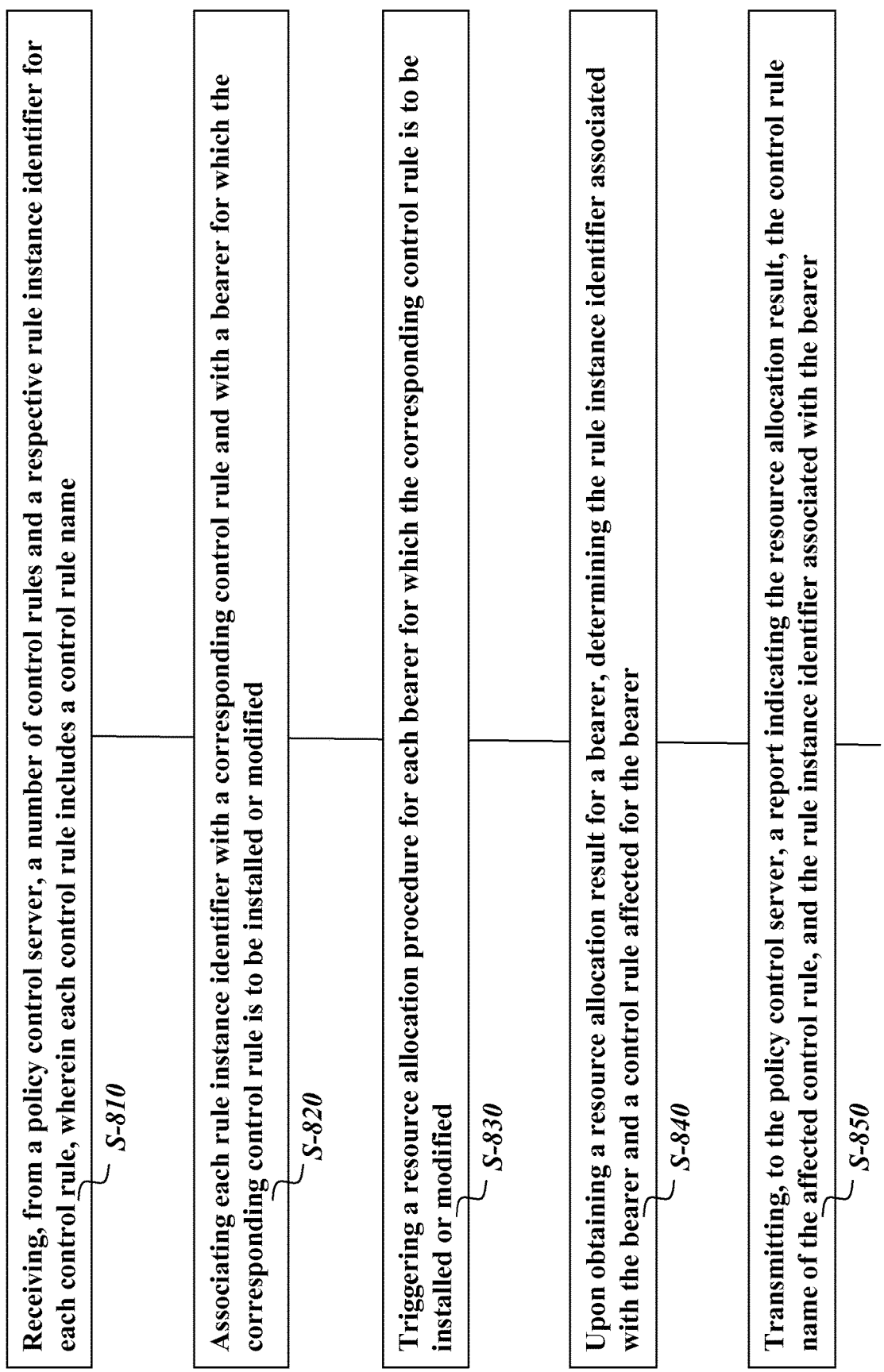
FIG. -8-

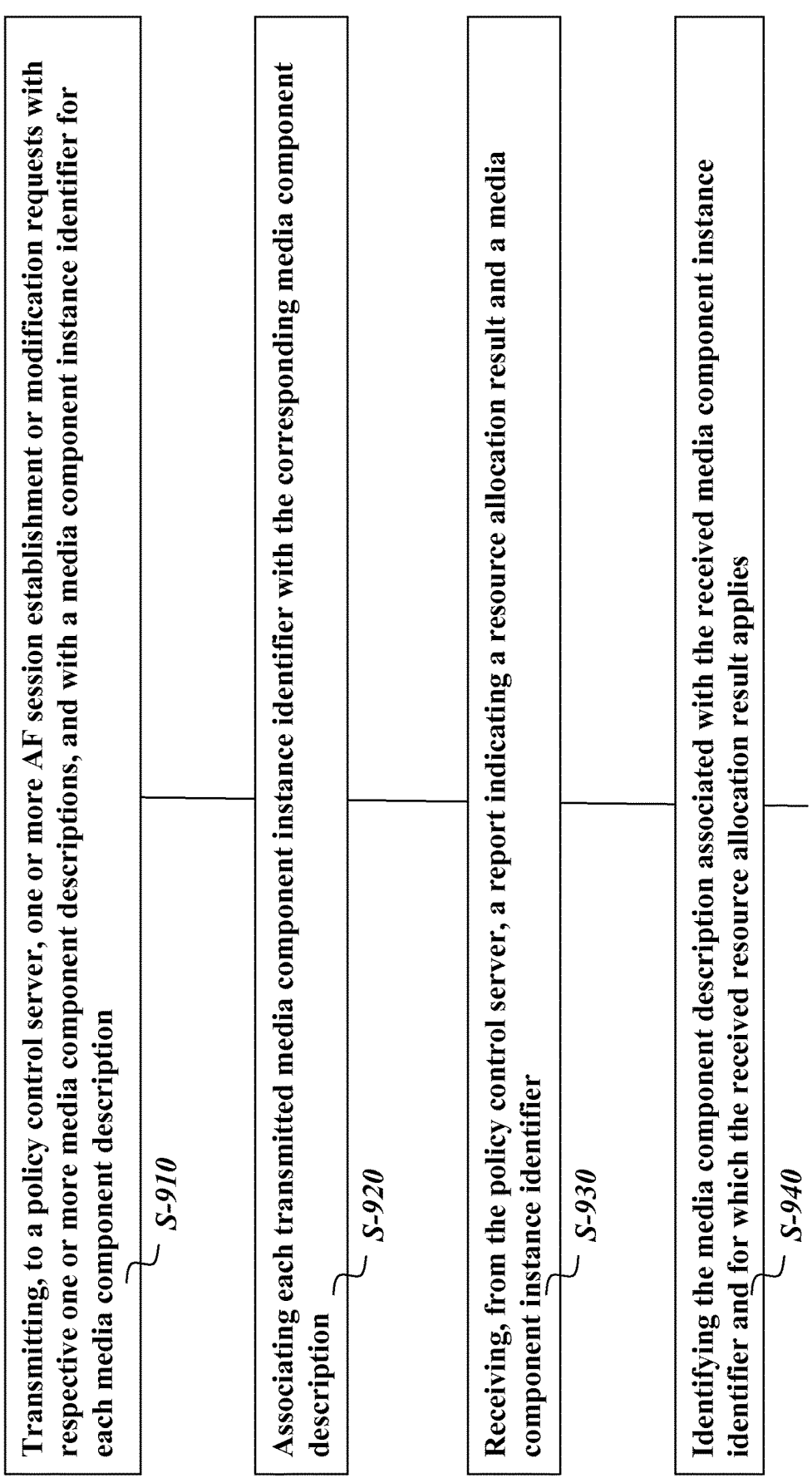
FIG.-9-

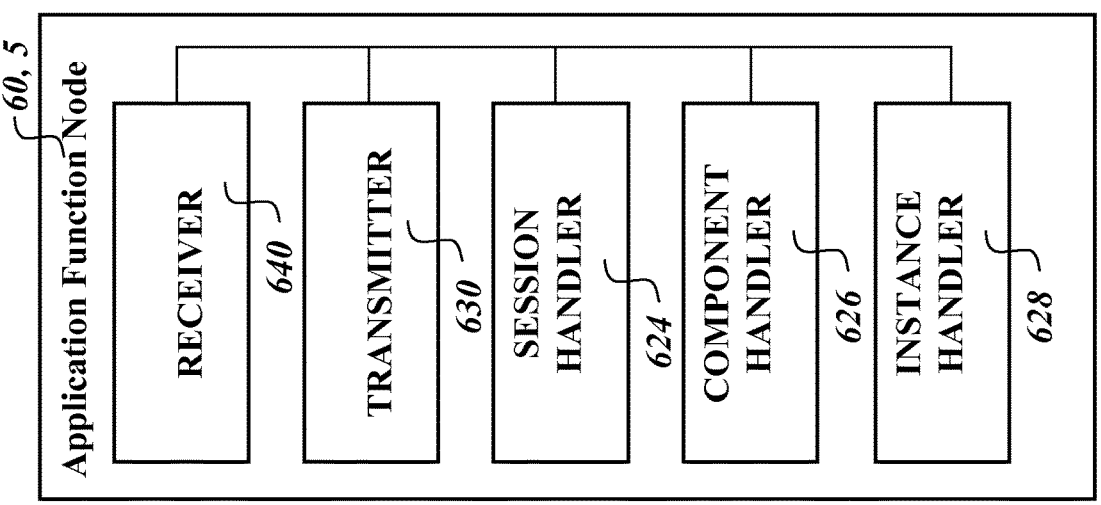
FIG. -12-
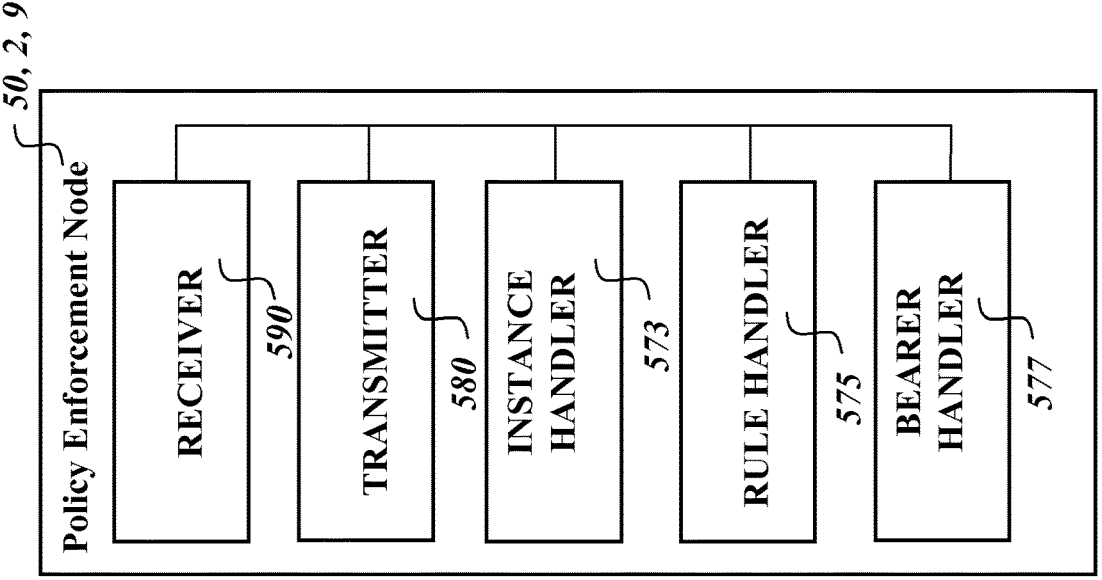
FIG. -11-
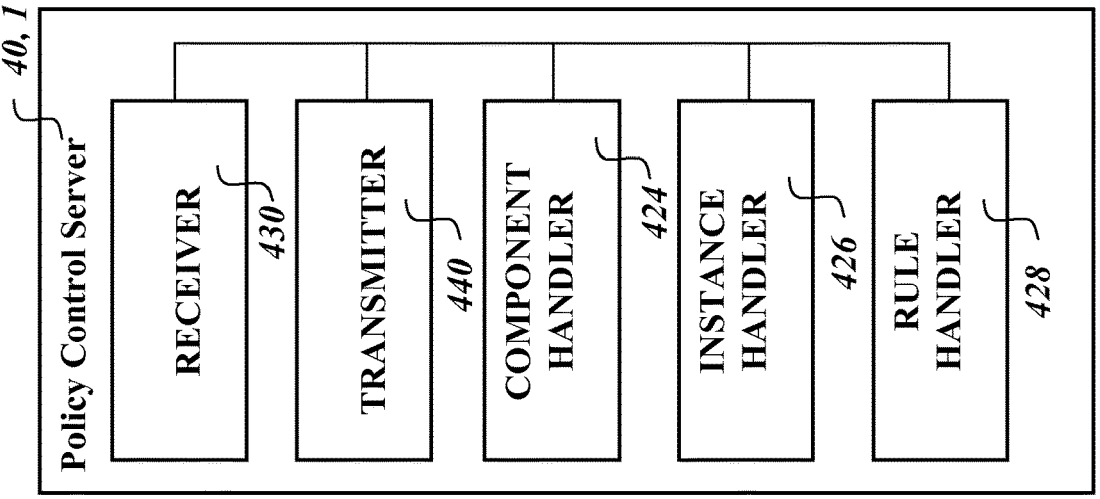
FIG. -10-

NETWORK-BASED POLICY CONTROL FOR SIMULTANEOUS ACCESSES

PRIORITY

This nonprovisional application is a U.S. National Stage Filing under 35 U.S.C. § 371 of International Patent Application Serial No. PCT/EP2016/064167 filed Jun. 20, 2016, and entitled "Network-Based Policy Control for Simultaneous Accesses" which is hereby incorporated by reference in its entirety.

TECHNICAL FIELD

The present invention generally relates to reporting a resource allocation result in a Policy and Charging Control architecture; and, more specifically, the invention relates to reporting resource allocation results when several reports are required in fast succession.

BACKGROUND

3GPP TS 23.203 (V.13.3.0) specifies the Policy and Charging Control (PCC) functionality for Evolved 3GPP Packet Switched domain, including both 3GPP accesses (GERAN/UTRAN/E-UTRAN) and Non-3GPP accesses. Amongst others, PCC functionality comprises a Policy and Charging Rules Function (PCRF), a Policy and Charging Enforcement Function (PCEF) and an Application Function (AF).

The PCRF is the functional element that encompasses policy control decision and flow based charging control functionalities. It provides network and gating control, and manages the flow based charging. Via the Diameter Gx interface and using PCC rules, the PCRF instructs the PCEF regarding the treatment of each service data flow. The PCRF can receive session and media related information from an AF.

The AF is an element offering applications the control of IP bearer resources and is able to require differentiation of Quality of Service (QoS) for such applications. The AF communicates with the PCRF, via a Diameter Rx interface, to transfer dynamic session information (i.e. description of the media to be delivered in the transport layer).

The AF may be deployed by the same operator offering the IP Connectivity Access Network (IP-CAN), or may be provided by an external third party service provider. An exemplary AF may be a Proxy Call Session Control Function (P-CSCF) of the IP Multimedia (IM) Core Network (CN) subsystem. For the sake of simplicity, the IM CN subsystem may be referred to as IMS hereinafter.

The PCEF encompasses service data flow detection, policy enforcement and flow based charging functionalities by enforcing the PCC rules received from the PCRF via the Diameter Gx interface.

This PCC architecture may also include a Bearer Binding and Event Reporting Function (BBERF) which, for the purpose of the present invention, behaves in a similar manner and for a similar purpose as the PCEF, but for receiving and handling Quality of Service (QoS) rules, via a Diameter Gxx interface, instead of PCC rules.

In particular, the PCEF may be located at e.g. a gateway GPRS support node (GGSN) in a general packet radio service (GPRS) core network. The GPRS core network allows 2G, 3G and WCDMA mobile networks to transmit IP packets to external networks such as the Internet. For the cases where there is a Proxy Mobile IP (PMIP) protocol instead of a GPRS tunnelling protocol (GTP) between a Bearer Binding and Event Reporting Function (BBERF) and the PCEF, the bearer binding is done in the BBERF instead. Moreover, the PCEF may also be located at e.g. a packet data network gateway (PGW) in an evolved packet system (EPS) network. The PGW, which may also be abbreviated as PDN GW, is the point of interconnection between the evolved packet core (EPC) and the external IP networks. Furthermore, the PCEF may also be located at e.g. a packet data gateway (PDG) for connecting an untrusted WLAN network with a 3GPP network. In this scenario, the PDG may be a gateway to a specific packet data network, such as the internet or an operator service network.

The PCRF, the PCEF, the BBERF and the AF, as illustrated in FIG. 1, are important players for policy control interactions. The PCC architecture, as well as the PCRF, the PCEF, the BBERF and the AF nodes are described in the 3GPP TS 23.203, the Diameter Rx reference point is described in the 3GPP TS 29.214 and the Diameter Gx and Gxx reference points are described in 3GPP TS 29.212.

Conventionally, whenever the AF initiates an Rx request towards the PCRF to establish an AF session, the PCRF creates the corresponding PCC/QoS rules and installs them in the PCEF/BBERF, so that one or more corresponding bearers are established or modified and correspondingly related resources are reserved.

Once the AF session is established, the AF can modify the service related information at any time, by sending an Rx request to the PCRF. This may happen, for example, when a new application is started and added to an existing Rx session, or when the AF modifies the priority of a multimedia priority service. Then, the PCRF performs policy control and modifies the existing PCC/QoS rules according to the service modifications required by the AF. The PCEF/BBERF modifies the identified PCC/QoS Rules and the related bearer procedures are initiated, when applicable.

In general, the AF requires to be notified about the outcome of the resource allocation procedure in order to trigger the required end-to-end signalling at application level, such as e.g. to initiate a session release, or take any other necessary actions in case of an unsuccessful allocation.

In scenarios like Mission Critical Push-To-Talk (MCPTT), the knowledge of this information may be critical for the operator in order to take the proper actions to ensure that the QoS of the network is appropriate to these critical demands. If the AF is not informed, the service will continue according to conditions that could not be adequate to the application and/or to the user. The user could also be charged incorrectly. When the AF subscribes to receive this information, the PCRF will inform the AF once the bearer procedure is completed, i.e. once the PCEF/BBERF informs the PCRF about the final resource status.

Apart from that, there are services that require a frequent modification of the service conditions over the Rx reference point (Rx interface). This is the case of e.g. the Public Safety solution, where the priority of the service is changed based on factors like location, subscription information or any application-dependent condition. The application expects the network to be adapted as soon as possible to the new priority conditions. In those cases, the AF can generate an Rx request towards the PCRF before having received the confirmation about a previous successful or unsuccessful resource reservation.

On the other hand, the signaling between the AF and the PCRF is asynchronous in respect of the signaling between the PCRF and the PCEF/BBERF, and also in respect of the signaling between the PCEF/BBERF and a serving gateway, such as e.g. Serving Gateway (SGW) or Serving GPRS Support Node (SGSN). In this situation, where a PCC/QoS rule is first installed and then subsequently updated in fast succession, it is not possible for the PCRF to know if a reported resource status corresponds to the first or subsequent PCC/QoS rule modification procedures, and the AF cannot properly be informed about whether the first or the subsequent resources have been properly allocated. For example, if the priority for a service was changed twice in a fast succession, it is not possible for the application to know if the priority treatment is according to the service demands related to the last request and, for services like those related to Public Safety, it is critical that the service is prioritized properly, and this information is necessary so that the application can take the proper actions.

SUMMARY

The present invention is aimed to at least minimize the above drawbacks and provides for new methods of reporting a resource allocation result when resource request and resource modifications occur in fast succession, each method carried out at one of a policy control server, a policy enforcement node and an application function (AF) node, as well as provides for new policy control server, policy enforcement node and AF node cooperating to carry out said methods.

In accordance with a first aspect of the present invention, there is provided a method of reporting a resource allocation result when resource request and resource modifications occur in fast succession, the method carried out at a policy control server.

This method comprises receiving, from an AF node, one or more AF session establishment or modification requests with respective one or more media component descriptions, and with a media component instance identifier for each media component description; associating each media component instance identifier with rule instance identifiers for control rules determined for the corresponding media component description, wherein each control rule includes a control rule name; and transmitting, to a policy enforcement node, the control rules and respective rule instance identifiers, for each media component description.

Then, this method also comprises receiving, from the policy enforcement node, a report indicating a resource allocation result, a control rule name for an affected control rule and a rule instance identifier; determining a media component instance identifier associated with the received rule instance identifier for the affected control rule; and transmitting, to the AF node, a report indicating the resource allocation result and the determined media component instance identifier.

In this method, successive rule instance identifiers may be generated at the policy control server with sequenced values. For example, each rule instance identifier may comprise a timestamp indicating the time when the rule instance identifier has been generated.

The sequenced values are advantageous to avoid unnecessary procedures. For example, when further reports are received for a control rule, with previous rule instance identifiers than a last rule instance identifier in a previously received report, such further reports may be ignored.

In an embodiment, this method may further comprise determining an IP flow associated with the received control rule name and affected by the resource allocation result; and, in this case, the report, transmitted to the AF node, may also indicate an identifier of the IP flow affected by the resource allocation result. This determination of the IP flow may be done when determining the media component instance identifier associated with the received rule instance identifier for the affected control rule.

In accordance with a second aspect of the present invention, there is provided a method of reporting a resource allocation result when resource request and resource modifications occur in fast succession, the method carried out at a policy enforcement node.

This method comprises receiving, from a policy control server, a number of control rules and a respective rule instance identifier for each control rule, wherein each control rule includes a control rule name; associating each rule instance identifier with a corresponding control rule and with a bearer for which the corresponding control rule is to be installed or modified; and triggering a resource allocation procedure for each bearer for which the corresponding control rule is to be installed or modified.

Then, this method also comprises, upon obtaining a resource allocation result for a bearer, determining the rule instance identifier associated with the bearer and a control rule affected for the bearer; and transmitting, to the policy control server, a report indicating the resource allocation result, the control rule name of the affected control rule, and the rule instance identifier associated with the bearer.

In particular, the resource allocation procedure triggered for each bearer may correspond to an establishment of a new bearer or a modification of an established bearer.

In accordance with a third aspect of the present invention, there is provided a method of reporting a resource allocation result when resource request and resource modifications occur in fast succession, the method carried out at an AF node.

This method comprises transmitting, to a policy control server, one or more AF session establishment or modification requests with respective one or more media component descriptions and with a media component instance identifier for each media component description; and associating each transmitted media component instance identifier with the corresponding media component description.

Further, this method also comprises receiving, from the policy control server, a report indicating a resource allocation result and a media component instance identifier; and identifying the media component description associated with the received media component instance identifier and for which the received resource allocation result applies.

In this method, successive media component instance identifiers may be generated at the AF node with sequenced values. For example, each media component instance identifier may comprise a timestamp indicating the time when the media component instance identifier has been generated.

The sequenced values are advantageous to avoid unnecessary procedures. For example, when further reports are received for a media component description, with previous media component instance identifiers than a last media component instance identifier in a previously received report, such further reports may be ignored.

In an embodiment of this method, the report, received from the policy control server, may also indicate an identifier of an IP flow affected by the resource allocation result; and in this embodiment, the method may further comprise identifying the affected IP flow.

Different embodiments of the above methods in accordance with first, second and third aspects of the invention may be provided wherein the policy control server is a network node implementing a Policy and Charging Rules Function (PCRF).

Different embodiments of the above methods in accordance with first, second and third aspects of the invention may be provided wherein the policy enforcement node is a network node implementing a Policy and Charging Enforcement Function (PCEF) and the control rules are Policy and Charging Control (PCC) rules.

Different embodiments of the above methods in accordance with first, second and third aspects of the invention may be provided wherein the policy enforcement node is a network node implementing a Bearer Binding and Event Reporting Function (BBERF) and the control rules are Quality of Service (QoS) rules.

Different embodiments of the above methods in accordance with first, second and third aspects of the invention may be provided wherein the AF node is a network node implementing an Application Function (AF) of a PCC architecture. For example, a P-CSCF.

In accordance with a fourth aspect of the present invention, there is provided a policy control server for providing control rules to be enforced at a policy enforcement node for resource allocation, and for reporting to an AF node a resource allocation result.

This policy control server, in an embodiment, may comprise at least one processor and at least one memory that stores processor-executable instructions, wherein the at least one processor interfaces with the at least one memory to execute the processor-executable instructions, whereby the policy control server is operable to: receive, from an AF node via a receiver, one or more AF session establishment or modification requests with respective one or more media component descriptions, and with a media component instance identifier for each media component description; associate each media component instance identifier with rule instance identifiers for control rules determined for the corresponding media component description, wherein each control rule includes a control rule name; and transmit, to a policy enforcement node via a transmitter, the control rules and respective rule instance identifiers, for each media component description.

In this embodiment, the policy control server is further operable to: receive, from the policy enforcement node via the receiver, a report indicating a resource allocation result, a control rule name for an affected control rule and a rule instance identifier; determine a media component instance identifier associated with the received rule instance identifier for the affected control rule; and transmit, to the AF node via the transmitter, a report indicating the resource allocation result and the determined media component instance identifier.

Particularly useful for this embodiment, the policy control server may further be operable to: determine an IP flow associated with the received control rule name and affected by the resource allocation result; and the report, transmitted to the AF node, may also indicate an identifier of the IP flow affected by the resource allocation result.

This policy control server, in another embodiment, may comprise a component handler configured to receive, from an AF node via a receiver, one or more AF session establishment or modification requests with respective one or more media component descriptions, and with a media component instance identifier for each media component description; an instance handler configured to associate each received media component instance identifier with rule instance identifiers for control rules determined for the corresponding media component description, wherein each control rule includes a control rule name; and a transmitter configured to transmit, to a policy enforcement node, the control rules and respective rule instance identifiers, for each media component description.

In this another embodiment for the policy control server, the receiver is further configured to receive, from the policy enforcement node, a report indicating a resource allocation result, a control rule name for an affected control rule and a rule instance identifier; the instance handler is further configured to determine a media component instance identifier associated with the received rule instance identifier for the affected control rule; and the component handler is configured to transmit, to the AF node via the transmitter, a report indicating the resource allocation result and the determined media component instance identifier.

Particularly useful for this another embodiment, the instance handler may further be configured to determine an IP flow associated with the received control rule name and affected by the resource allocation result; and the report, transmitted from the component handler to the AF node, may also indicate an identifier of the IP flow affected by the resource allocation result.

In particular and valid for both embodiments of the policy control server, successive rule instance identifiers may be generated at the policy control server with sequenced values. For example, each rule instance identifier may comprise a timestamp indicating the time when the rule instance identifier has been generated.

The sequenced values are advantageous to avoid unnecessary procedures. For example, when further reports are received for a control rule, with previous rule instance identifiers than a last rule instance identifier in a previously received report, such further reports may be ignored.

In an embodiment, the policy control server may be a network node implementing a PCRF of the PCC architecture.

In accordance with a fifth aspect of the present invention, there is provided a policy enforcement node for enforcing control rules received from a policy control server for resource allocation, and for reporting to the policy control server a resource allocation result.

This policy enforcement node, in an embodiment, may comprise at least one processor and at least one memory that stores processor-executable instructions, wherein the at least one processor interfaces with the at least one memory to execute the processor-executable instructions, whereby the policy enforcement node is operable to: receive, from a policy control server via a receiver, a number of control rules and a respective rule instance identifier for each control rule, wherein each control rule includes a control rule name; associate each rule instance identifier with a corresponding control rule and with a bearer for which the corresponding control rule is to be installed or modified; and trigger a resource allocation procedure for each bearer for which the corresponding control rule is to be installed or modified.

In this embodiment, the policy enforcement node is further operable to: determine, upon obtaining a resource allocation result for a bearer, the rule instance identifier associated with the bearer and a control rule affected for the bearer; and transmit, to the policy control server via a transmitter, a report indicating the resource allocation result, the control rule name of the affected control rule, and the rule instance identifier associated with the bearer.

This policy enforcement node, in another embodiment, may comprise a rule handler configured to receive, from a policy control server via a receiver, a number of control rules and a respective rule instance identifier for each control rule, wherein each control rule includes a control rule name; an instance handler configured to associate each received rule instance identifier with a corresponding control rule; and a bearer handler configured to associate each received rule instance identifier with a bearer for which the corresponding control rule is to be installed or modified, and trigger a resource allocation procedure for the bearers for which the corresponding control rules are to be installed or modified.

In this another embodiment for the policy enforcement node, the receiver is further configured to obtain a resource allocation result for a bearer; the bearer handler may be configured to determine a rule instance identifier associated with the bearer, and identify to the instance handler this rule instance identifier associated with the bearer; the instance handler may be configured to determine a control rule associated with the identified rule instance identifier and thus affected for the bearer, and identify to the rule handler the identified rule instance identifier and the affected control rule; and the rule handler may be configured to transmit, to the policy control server via a transmitter, a report indicating the resource allocation result, the control rule name of the affected control rule, and the rule instance identifier associated with the bearer.

Particularly applicable in this another embodiment, the rule handler may be configured to determine the bearer for which the control rules are to be installed or modified.

In particular and valid for both embodiments of the policy enforcement node, the resource allocation procedure may correspond to an establishment of a new bearer or a modification of an established bearer.

In an embodiment, the policy enforcement node may be a network node implementing a PCEF of the PCC architecture, and the control rules are PCC rules.

In an embodiment, the policy enforcement node may be a network node implementing a BBERF of the PCC architecture, and the control rules are QoS rules.

In accordance with a sixth aspect of the present invention, there is provided an application function (AF) node for offering applications a control of bearer resources, and for receiving resource allocation results from a policy control server.

This AF node, in an embodiment, may comprise at least one processor and at least one memory that stores processor-executable instructions, wherein the at least one processor interfaces with the at least one memory to execute the processor-executable instructions, whereby the AF node is operable to: transmit, to a policy control server via a transmitter, one or more AF session establishment or modification requests with respective one or more media component descriptions, and with a media component instance identifier for each media component description; associate each transmitted media component instance identifier with the corresponding media component description; receive, from the policy control server via a receiver, a report indicating a resource allocation result and a media component instance identifier; and identify the media component description associated with the received media component instance identifier and for which the received resource allocation result applies.

Particularly useful for this embodiment, the report received from the policy control server may also indicate an identifier of an IP flow affected by the resource allocation result; and, in this case, the AF node may further be operable to identify the affected IP flow.

This AF node, in another embodiment, may comprise a session handler configured to transmit, to a policy control server via a transmitter, one or more AF session establishment or modification requests with respective one or more media component descriptions, and with a media component instance identifier for each media component description; and an instance handler configured to associate each transmitted media component instance identifier with the corresponding media component description.

In this another embodiment for the AF node, the session handler is configured to receive, from the policy control server via a receiver, a report indicating a resource allocation result and a media component instance identifier; the instance handler is configured to identify a media component description associated with the received media component instance identifier; and the AF node further comprises a component handler configured to apply the received resource allocation result for the identified media component description.

Particularly useful for this another embodiment, the report received at the session handler, from the policy control server via the receiver, may also indicate an identifier of an IP flow affected by the resource allocation result; the instance handler may be configured to identify the affected IP flow; and the component handler may be configured to apply the received resource allocation result for the affected IP flow.

In this another embodiment for the AF node, the component handler may be configured to handle media component descriptions for corresponding media components, and may be configured to identify to the session handler the media component description and media component for which the received resource allocation result applies.

In particular and valid for both embodiments of the AF node, successive media component instance identifiers may be generated at the AF node with sequenced values. For example, each media component instance identifier may comprise a timestamp indicating the time when the media component instance identifier has been generated.

The sequenced values are advantageous to avoid unnecessary procedures. For example, when further reports are received for a media component description, with previous media component instance identifiers than a last media component instance identifier in a previously received report, such further reports may be ignored.

BRIEF DESCRIPTION OF THE DRAWINGS

The features, objects and advantages of the invention will become apparent by reading this description in conjunction with the accompanying drawings, in which:

FIG. 1 represents a basic policy and charging control architecture in accordance with 3GPP.

FIGS. 2a and 2b show a conventional scenario where a conflict arises in the event of frequent modifications of service conditions over the Rx interface.

FIGS. 3a and 3b illustrate an exemplary method, in accordance with an embodiment of the present invention, to solve the conflict arising in the conventional scenario shown in FIGS. 2a and 2b.

FIG. 4 shows a basic component structure of a policy control server in accordance with an embodiment.

FIG. 5 shows a basic component structure of a policy enforcement node in accordance with an embodiment.

FIG. 6 shows a basic component structure of an application function node in accordance with an embodiment.

FIG. 7 illustrates an exemplary sequence of actions carried out by the policy control server, in accordance with an embodiment, to report a resource allocation result when resource request and resource modifications occur in fast succession.

FIG. 8 illustrates an exemplary sequence of actions carried out by the policy enforcement node, in accordance with an embodiment, to report a resource allocation result when resource request and resource modifications occur in fast succession.

FIG. 9 illustrates an exemplary sequence of actions carried out by the application function node, in accordance with an embodiment, to report a resource allocation result when resource request and resource modifications occur in fast succession.

FIG. 10 shows a basic component structure of a policy control server in accordance with another embodiment.

FIG. 11 shows a basic component structure of a policy enforcement node in accordance with another embodiment.

FIG. 12 shows a basic component structure of an application function node in accordance with another embodiment.

DETAILED DESCRIPTION

The following describes currently preferred embodiments of apparatuses and methods of reporting a resource allocation result when resource request and resource modifications occur in fast succession. More particularly, the following also describes a policy control server, a policy enforcement node, an application function node and respectively executed methods of reporting a resource allocation result when resource request and resource modifications occur in fast succession.

In this respect, the following describes methods of reporting a resource allocation result when resource request and resource modifications occur in fast succession, these methods are respectively executed at a policy control server, a policy enforcement node and an application function node, and are respectively illustrated in FIG. 7, FIG. 8 and FIG. 9.

On the other hand, the apparatuses contributing in reporting a resource allocation result when resource request and resource modifications occur in fast succession, are described in the following with reference to specific implementations of such apparatuses, i.e. a policy control server, a policy enforcement node and an application function node, as respectively illustrated in FIG. 4, FIG. 5 and FIG. 6, in one embodiment, and as respectively illustrated in FIG. 10, FIG. 11 and FIG. 12, in another embodiment.

In particular, the policy control server 40 illustrated in FIG. 4 and FIG. 10 may be a node implementing a PCRF 1 of the PCC architecture with reference to FIG. 1. Also in particular, the policy enforcement node 50 illustrated in FIG. 5 and FIG. 11 may be a node implementing any one of a PCEF 2 and a BBERF 9 of the PCC architecture with reference to FIG. 1. Further in particular, the application function node 60 illustrated in FIG. 6 and FIG. 12 may be a node implementing an AF 5 of the PCC architecture with reference to FIG. 1.

Apart from these entities, the PCC architecture illustrated in FIG. 1 also comprises a Subscription Profile Repository (SPR) 1, a Resource Admission Control Function (RACF) 10, a User Data Repository (UDR) 8, an Online Charging System (OCS) 7, an Offline Charging System (OFCS) 6, a Gateway 22 where the PCEF is usually implemented, a Traffic Detection Function (TDF) 4, and a Traffic Steering Support Function (TSSF) 11.

Moreover, the PCEF 2 and the BBERF 9 may co-exist in at least some embodiments discussed throughout this specification, so that nothing prevents the policy control server from communicating with more than one policy enforcement node, even if not all the exemplary policy enforcement nodes are illustrated in drawings.

In the context of the PCC architecture illustrated in FIG. 1, a conflict arises as reporting a resource allocation result when a resource request and successive resource modifications occur in fast succession over the Rx interface, as explained in the following with reference to FIG. 2a and FIG. 2b.

As FIG. 2a illustrates, this conventional scenario assumes as a pre-condition that an AF session establishment procedure, with a subscription to notifications of unsuccessful resource allocation, has been carried out between AF 5, PCRF 1 and PCEF 2 during step S-200. During step S-205 and due to an internal or external trigger, the AF 5 determines that a new media component is required for an existing session and, during step S-210, transmits to the PCRF 1 an AF session modification request with an AA-Request (AAR) command including service information with media component description.

Conventionally, this subscription to notifications of unsuccessful resource allocation is carried out by submitting a Specific-Action AVP set to INDICATION_OF_FAILED_RESOURCES_ALLOCATION within an initial AAR command.

The PCRF 1 performs session binding, service authorization and policy control, and responds to the AF 5 with an AA-Answer (AAA) command during step S-215. Then, during step S-220, the PCRF determines PCC rules related to the new media component and transmits the PCC rules to the PCEF 2 with an RA-Request (RAR) command.

At this stage and whilst the PCEF is handling the received PCC rules, the AF 5 elevates the priority of that media, during step S-225 and due to an internal or external trigger.

More or less in parallel with this trigger, during step S-230, the PCEF 2 accepts the installation of the PCC rules with an RA-Answer (RAA) command and, during step S-235, the PCEF performs bearer binding and, in this example, initiates a new dedicated bearer to transport the service requested by the AF.

Overlapping with the process carried out by the PCEF 2, the AF 5 submits to the PCRF 1, during step S-240, an AF session modification request with an AAR command containing the media component description with updated service information, i.e. to indicate higher priority. The PCRF 1 performs authorization and policy control, and accepts the updated service information, during step S-245, with an AAA command.

In accordance with the conventional mechanism, during step S-250, the PCRF 1 updates the PCC rules for the media component, and transmits to the PCEF 2 the updated PCC rules with a RAR command. The PCEF accepts and acknowledges the modification of the PCC rules with a RAA command, during step S-255, but queues this request until the bearer establishment procedure initiated in step S-235 is completed.

The result of the bearer establishment procedure initiated in step S-235 for the new dedicated bearer is received at the PCEF 2 during step S-260 as illustrated in FIG. 2b.

In this exemplary scenario illustrated in FIG. 2b, this result received during step S-260 is unsuccessful, so that, during step S-265, the PCEF 2 determines affected PCC rules for the bearer, and reports the unsuccessful resource allocation to the PCRF 1 with a CC-Request (CCR) command that comprises PCC rule names for affected PCC rules and a failure reason code. The PCRF identifies the affected PCC rules by the received PCC rule names and acknowledges the report with a CC-Answer (CAA) command during step S-270. Then, during step S-275, the PCRF 1 also reports the unsuccessful resource allocation to the AF 5 with a RAR command that comprises a failure reason and indication of affected IP flows. The AF acknowledges the report with a RAA command during step S-280.

In parallel with these reports, during step S-285, the PCEF 2 handles the bearer establishment request that was queued with reference to step S-255 commented above. In this respect, given that the result obtained during step S-260 is unsuccessful, for the previous bearer establishment request transmitted during step S-235, the PCEF triggers a new bearer establishment request, during step S-285; otherwise the PCEF would have trigger a bearer modification request. At this stage, due to the report with the unsuccessful resource allocation received during step S-275, the AF 5 assumes during step S-290 that resources are not available for the media with higher priority lately requested.

However, in this case, the PCEF 2 receives during step S-295 a successful resource allocation for the bearer establishment request initiated in step S-285, that is, the resource allocation for the media with higher priority lately requested. Since the resource allocation result is successful, the PCEF 2 does not need to report such result to the PCRF 1, and the PCRF 1 does not notify the AF 5 for the same reason.

In this situation, a conflict arises because the AF believes that resources are not available for the new media with higher priority whilst the PCEF has successfully created a new bearer to this end.

This conflict is solved with an overall method of reporting a resource allocation result when resource request and resource modifications occur in fast succession, the overall method carried out by a policy control server, a policy enforcement node and an application function node.

More precisely, the following describes the particular methods carried out by each one of the policy control server, policy enforcement node and application function node and contributing to the overall method of reporting a resource allocation result when resource request and resource modifications occur in fast succession.

FIG. 7 illustrates a method of reporting a resource allocation result when resource request and resource modifications occur in fast succession, the method carried out at a policy control server 40.

This method at the policy control server 40 comprises receiving, from an AF node 60 during step S-710, one or more AF session establishment or modification requests with respective one or more media component descriptions, and with a media component instance identifier for each media component description.

This method also comprises, during step S-720, associating each media component instance identifier with rule instance identifiers for control rules determined for the corresponding media component description, wherein each control rule includes a control rule name; and, during step S-730, transmitting, to a policy enforcement node 50, the control rules and respective rule instance identifiers, for each media component description.

This method also comprises, during step S-740, receiving, from the policy enforcement node, a report indicating a resource allocation result, a control rule name for an affected control rule and a rule instance identifier; during step S-750, determining a media component instance identifier associated with the received rule instance identifier for the affected control rule; and, during step S-760, transmitting, to the AF node, a report indicating the resource allocation result and the determined media component instance identifier.

In particular embodiments, during step S-750, this method may comprise determining an IP flow associated with the received control rule name and affected by the resource allocation result. When this is the case, the report transmitted to the AF node, during step S-760, also indicates an identifier of the IP flow affected by the resource allocation result.

FIG. 8 illustrates a method of reporting a resource allocation result when resource request and resource modifications occur in fast succession, the method carried out at a policy enforcement node 50.

This method at the policy enforcement node 50 comprises receiving, from a policy control server 40 during step S-810, a number of control rules and a respective rule instance identifier for each control rule, wherein each control rule includes a control rule name.

This method also comprises, during step S-820, associating each rule instance identifier with a corresponding control rule and with a bearer for which the corresponding control rule is to be installed or modified; and, during step S-830, triggering a resource allocation procedure for each bearer for which the corresponding control rule is to be installed or modified. In particular, the resource allocation procedure may correspond to an establishment of a new bearer or a modification of an established bearer.

This method also comprises, upon obtaining a resource allocation result for a bearer, determining during step S-840 the rule instance identifier associated with the bearer and a control rule affected for the bearer; and transmitting during step S-850, to the policy control server, a report indicating the resource allocation result, the control rule name of the affected control rule, and the rule instance identifier associated with the bearer.

FIG. 9 illustrates a method of reporting a resource allocation result when resource request and resource modifications occur in fast succession, the method carried out at an AF node 60.

This method at the AF node 60 comprises transmitting, to a policy control server 40 during step S-910, one or more AF session establishment or modification requests with respective one or more media component descriptions, and with a media component instance identifier for each media component description; and, during step S-920, associating each transmitted media component instance identifier with the corresponding media component description.

This method also comprises receiving, from the policy control server during step S-930, a report indicating a resource allocation result and a media component instance identifier; and, during step S-940, identifying the media component description associated with the received media component instance identifier and for which the received resource allocation result applies.

In particular embodiments of this method illustrated in FIG. 9 and aligned with particular embodiments of the method illustrated in FIG. 7, the report received from the policy control server, during step S-930, may also indicate an identifier of an IP flow affected by the resource allocation result. When this is the case, the method may further comprise identifying the affected IP flow for which the received resource allocation result applies.

In these methods discussed above with reference to FIG. 7, FIG. 8 and FIG. 9, the policy control server 40 may be a network node implementing a PCRF 1 of the PCC architecture illustrated in FIG. 1; the policy enforcement node 50 may be a node implementing a PCEF 2 of the PCC architecture illustrated in FIG. 1, and the control rules may be PCC rules; the policy enforcement node 50 may be a node implementing a BBERF 9 of the PCC architecture illustrated in FIG. 1, and the control rules may be QoS rules; and the AF node may be a network node implementing an AF 5 of the PCC architecture illustrated in FIG. 1.

These methods discussed above with reference to FIG. 7, FIG. 8 and FIG. 9, when respectively carried out by the PCRF 1, PCEF 2 and AF 5 of the PCC architecture effectively solve the exemplary conflict discussed above with reference to FIG. 2a and FIG. 2b.

FIGS. 3a and 3b show the same exemplary scenario as FIG. 2a and FIG. 2b, now without any conflict and with the AF enabled to distinguish the outcome of each modification in a univocally way. In this exemplary scenario, GTP is used in the core network, i.e. the BBERF is not used and the PCRF does not generate QoS rules. Instead the bearer binding is performed in the PCEF and the PCRF only generates PCC rules. The invention however can also apply for PCC deployments where PMIP is used between the BBERF and the PCEF.

Moreover, the proposed information elements in the different interfaces are defined as AVPs considering Diameter as the protocol used in the PCC deployments. Recently, Rx interface (or Rx reference point) has also been specified using REST. Thus, although the information elements are described in a specific format for readability purposes, the invention is not limited to a specific protocol.

As FIG. 3a illustrates, this scenario also assumes as a pre-condition that an AF session establishment procedure, with a subscription to notifications of unsuccessful resource allocation, has been carried out between AF 5, PCRF 1 and PCEF 2 during step S-300. During step S-305 and due to an internal or external trigger, the AF 5 determines that a new media component is required for an existing session and determines a media component instance identifier for the corresponding media component description.

As commented above in respect of FIG. 2a and if Diameter protocol is used over the Rx interface, this subscription to notifications of unsuccessful resource allocation is carried out during step S-300 by submitting a Specific-Action AVP set to INDICATION_OF_FAILED_RESOURCES_ALLOCATION within an initial AAR command.

Then, during step S-310, the AF 5 transmits to the PCRF 1 an AF session modification request with an AAR command including service information, with the corresponding media component description, and the determined media component instance identifier (e.g. MC_instance=MC1).

The PCRF 1 performs session binding, service authorization and policy control, and responds to the AF 5 with an AAA command during step S-315.

Then, during step S-320, the PCRF determines PCC rules related to the new media component, determines rule instance identifiers for the PCC rules (e.g. Rule_Instance=R1), associates the received media component instance identifier (e.g. MC_instance=MC1) with the determined rule instance identifiers (e.g. Rule_Instance=R1), and transmits the PCC rules and respective rule instance identifiers to the PCEF 2 with an RAR command.

At this stage and whilst the PCEF is handling the received PCC rules, the AF 5 elevates the priority of that media, during step S-325 and due to an internal or external trigger. More or less in parallel with this trigger, during step S-330, the PCEF 2 accepts the installation of the PCC rules with an RAA command.

During step S-335, the PCEF performs bearer binding and, in this example, initiates a new dedicated bearer to transport the service requested by the AF and associates each rule instance identifier (e.g. Rule_Instance=R1) with the bearer for which the corresponding PCC rule is to be installed or modified.

Overlapping with the process carried out by the PCEF 2, the AF 5 transmits to the PCRF 1, during step S-340, an AF session modification request with an AAR command comprising the media component description with updated service information, i.e. to indicate higher priority, and with a new media component instance identifier (e.g. MC_instance=MC2). The PCRF 1 performs authorization and policy control, and accepts the updated service information, during step S-345, with an AAA command.

Then, during step S-350, the PCRF 1 updates the PCC rules for the media component, determines new rule instance identifiers for the updated PCC rules (e.g. Rule_Instance=R2), associates the received media component instance identifier (e.g. MC_instance=MC2) with the determined new rule instance identifiers (e.g. Rule_Instance=R2), and transmits to the PCEF 2 the updated PCC rules and respective rule instance identifiers with a RAR command. The PCEF accepts and acknowledges the modification of the PCC rules with a RAA command, during step S-355, but queues this request until the bearer establishment procedure initiated in step S-335 is completed.

The result of the bearer establishment procedure initiated in step S-335 for the new dedicated bearer is received at the PCEF 2 during step S-360 as illustrated in FIG. 3b.

In this exemplary scenario illustrated in FIG. 3b, this result received during step S-360 is unsuccessful so that, during step S-365, the PCEF 2 determines affected PCC rules for the bearer and rule instance identifiers (e.g. Rule_Instance=R1) associated with the bearer, and reports the unsuccessful resource allocation to the PCRF 1 with a CCR command that comprises PCC rule names for affected PCC rules, failure reason code and the associated rule instance identifiers (e.g. Rule_Instance=R1). The PCRF identifies the affected PCC rules by the received PCC rule names and acknowledges the report with a CAA command during step S-370.

Then, during step S-375, the PCRF 1 determines a media component instance identifier (e.g. MC_instance=MC1) associated with the received rule instance identifiers (e.g. Rule_Instance=R1), and reports the unsuccessful resource allocation to the AF 5 with a RAR command that comprises a failure reason, indication of affected IP flows and the determined media component instance identifier (e.g. MC_instance=MC1). The AF, during step S-380, acknowledges the report with a RAA command, and detects that there was a later AF session modification request transmitted during step S-340 and that is pending to be applied. Hence, the AF understands that the notification received from the PCRF does not correspond to the later AF session modification request, but merely that resource reservation has failed for a previous AF session modification request. The AF then, does not take any action, but waits for the outcome of AF session modification request transmitted during step S-340.

Further, during step S-390, the AF 5 identifies the media component description associated with the received media component instance identifier and for which the resource allocation result is unsuccessful.

In parallel with these reports, during step S-385, the PCEF 2 handles the bearer establishment request that was queued with reference to step S-355 commented above. As explained above with reference to FIG. 2b, given that the result obtained during step S-360 is unsuccessful, for the previous bearer establishment request sent during step S-335, the PCEF triggers a new bearer establishment request, during step S-385; otherwise the PCEF would have trigger a bearer modification request. In this case, the PCEF 2 receives during step S-395 a successful resource allocation for the bearer establishment request initiated in step S-385. Since the resource allocation result is successful, the PCEF 2 does not need to report such result to the PCRF 1, and the PCRF 1 does not notify the AF 5 for the same reason.

At this stage, and in contrast with the conflicting scenario discussed above with reference to FIG. 2*a* and FIG. 2*b*, in the scenario shown in FIG. 3*a* and FIG. 3*b* the AF 5 has correctly identified, during step S-390, the media component description for which the resource allocation result was unsuccessful and correctly identifies, during step S-397, that resources are available for the media with higher priority lately requested.

In this situation, the conflict illustrated with reference to FIG. 2*a* and FIG. 2*b* has been solved because the AF receives the media component instance identifier that univocally identifies the process involved for a media component.

In an embodiment, the policy control server 40 participating in the method illustrated in FIG. 7 and/or the PCRF 1 participating in the method illustrated in FIG. 3*a* and FIG. 3*b* may be configured to generate successive rule instance identifiers with sequenced values. Where this is the case, further reports received at the policy control server 40 and/or the PCRF 1 for a control rule, with previous rule instance identifiers than a last rule instance identifier in a previously received report, are ignored.

In an embodiment, the AF node 60 participating in the method illustrated in FIG. 9 and/or the AF 5 participating in the method illustrated in FIG. 3*a* and FIG. 3*b* may be configured to generate successive media component instance identifiers with sequenced values. Where this is the case, further reports received at the AF node 60 and/or the AF 5 for a media component description, with previous media component instance identifiers than a last media component instance identifier in a previously received report, are ignored.

The policy control server 40, the policy enforcement node 50 and the AF node 60, which in particular may respectively correspond to a PCRF 1, PCEF 2 and AF 5 of the PCC architecture, are respectively illustrated in FIG. 4, FIG. 5 and FIG. 6, in accordance with an embodiment, and in FIG. 10, FIG. 11 and FIG. 12, in accordance with another embodiment.

In accordance with an embodiment illustrated on FIG. 4, the policy control server 40 may comprise at least one processor 420, and at least one memory 410 that stores processor-executable instructions 414. In this policy control server, the at least one processor interfaces with the at least one memory to execute the processor-executable instructions, whereby the policy control server is operable to perform the actions disclosed in the following.

The policy control server 40 is thus operable to receive, from an AF node 60 via a receiver 430, one or more AF session establishment or modification requests with respective one or more media component descriptions, and with a media component instance identifier for each media component description.

Upon receiving each AF session establishment or modification request with a media component description and a media component instance identifier, the policy control server 40 is further operable to associate the received media component instance identifier with rule instance identifiers for control rules determined for the corresponding media component description, and to transmit, to a policy enforcement node 50 via a transmitter 440, the control rules and respective rule instance identifiers, for the media component description. In particular, and for the sake of clarification, each control rule includes a control rule name distinguishable from the rule instance identifiers.

Further, the policy control server 40 is operable to receive, from the policy enforcement node 50 via the receiver 430, a report indicating a resource allocation result, a control rule name for an affected control rule and a rule instance identifier; to determine a media component instance identifier associated with the received rule instance identifier for the affected control rule; and to transmit, to the AF node 60 via the transmitter 440, a report indicating the resource allocation result and the determined media component instance identifier.

In an embodiment, this policy control server 40 may further be operable to: determine an IP flow associated with the received control rule name and affected by the resource allocation result; and the report, transmitted to the AF node, may also indicate an identifier of the IP flow affected by the resource allocation result.

In particular, a component handler 424 running in a processor 420 may handle the reception of each AF session establishment or modification request with a media component description and a media component instance identifier, and the transmission of the report indicating the resource allocation result and the determined media component instance identifier.

Also in particular, a rule handler 428 running in a processor 420 may determine the control rules for each received media component description; an instance handler 426 running in a processor 420 may associate each received media component instance identifier with rule instance identifiers for the control rules determined for each media component description; and any one of the rule handler 428, the instance handler 426 or the processor 420 itself may control the transmitter 440 to transmit, to the policy enforcement node 50, the control rules and respective rule instance identifiers, for each media component description.

Further, upon receiving from the policy enforcement node 50 the report indicating a resource allocation result, a control rule name for an affected control rule and a rule instance identifier, the instance handler 426, likely in cooperation with the rule handler 428, may determine a media component instance identifier associated with the received rule instance identifier for the affected control rule; any one of the rule handler 428, the instance handler 426 or the processor 420 itself may provide the resource allocation result and the determined media component instance identifier to the component handler 424; and the component handler 424 may control the transmitter 440 to transmit, to the AF node 60, the report indicating the resource allocation result and the determined media component instance identifier.

In an embodiment, the instance handler 426, likely in cooperation with the rule handler 428, may determine an IP flow associated with the received control rule name and affected by the resource allocation result; any one of the rule handler 428, the instance handler 426 or the processor 420 itself may provide an identifier of the IP flow affected by the resource allocation result to the component handler 424; and the report, transmitted from the component handler to the AF node, may also indicate the identifier of the IP flow affected by the resource allocation result.

If required at all, the policy control server 40 may be complemented with a data section 418 in memory to store any one of the control rules, media component instance identifiers, rule instance identifiers and associations thereof.

The policy control server 40 illustrated in FIG. 4 may thus comprise the at least one processor 420 and the at least one memory 410, both in communication with each other, with the component handler 424, the instance handler 426, the rule handler 428, the receiver 430 and the transmitter 440, and with other elements or units of policy control server 40. The at least one memory 410 may comprise volatile and/or non-volatile memory. In particular, the at least one memory 410 may have a computer program 414 and data 418 stored therein. The computer program 414 may be loaded in the at least one memory 410 from a computer program product 400, such as any non-transitory computer readable medium, in which the computer program is stored. The data 418 may comprise any one of the control rules, media component instance identifiers, rule instance identifiers and associations thereof. The at least one processor 420 may be configured to carry out the functions of the component handler 424, the instance handler 426 and the rule handler 428.

In accordance with an embodiment illustrated on FIG. 5, the policy enforcement node 50 may comprise at least one processor 570, and at least one memory 560 that stores processor-executable instructions 564. In this policy enforcement node, the at least one processor interfaces with the at least one memory to execute the processor-executable instructions, whereby the policy enforcement node is operable to perform the actions disclosed in the following.

The policy enforcement node 50 is thus operable to receive, from a policy control server 40 via a receiver 590, a number of control rules and a respective rule instance identifier for each control rule. As already commented above, each control rule includes a control rule name distinguishable from the rule instance identifiers.

Upon receiving the control rules and respective rule instance identifiers, the policy enforcement node 50 is further operable to associate each received rule instance identifier with a corresponding control rule and with a bearer for which the corresponding control rule is to be installed or modified, and to trigger a resource allocation procedure for each bearer for which the corresponding control rule is to be installed or modified. In particular, the resource allocation procedure may correspond to an establishment of a new bearer or a modification of an established bearer.

Upon obtaining a resource allocation result for a bearer, the policy enforcement node 50 is further operable to determine the rule instance identifier associated with the bearer and a control rule affected for the bearer, and to transmit, to the policy control server 40 via a transmitter 580, a report indicating the resource allocation result, the control rule name of the affected control rule, and the rule instance identifier associated with the bearer.

In particular, a rule handler 575 running in a processor 570 may receive the control rules and a respective rule instance identifier for each control rule; an instance handler 573 running in a processor 570 may handle associations between the received rule instance identifiers and corresponding control rules; and a bearer handler 577 running in a processor 570 may handle associations between the received rule instance identifiers and bearers for which the control rules are to be installed or modified, and trigger a resource allocation procedure for the bearers for which the corresponding control rules are to be installed or modified. In particular, the resource allocation procedure may correspond to an establishment of a new bearer or a modification of an established bearer.

Further, upon obtaining a resource allocation result for a bearer, the bearer handler 577 may determine a rule instance identifier associated with the bearer and identify to the instance handler 573 this rule instance identifier associated with the bearer; the instance handler 573 may determine a control rule associated with the identified rule instance identifier and thus affected for the bearer, and identify to the rule handler 575 the affected control rule and rule instance identifier associated with the bearer; and the rule handler 575 may control the transmission of the report indicating the resource allocation result, the control rule name of the affected control rule, and the rule instance identifier associated with the bearer.

In an embodiment, the rule handler 575 may determine the bearer for which the control rules are to be installed or modified.

If required at all, the policy enforcement node 50 may be complemented with a data section 568 in memory to store any one of the control rules, bearer identifiers, rule instance identifiers and associations thereof.

The policy enforcement node 50 illustrated in FIG. 5 may thus comprise the at least one processor 570 and the at least one memory 560, both in communication with each other, with the instance handler 573, the rule handler 575, the bearer handler 577, the receiver 590 and the transmitter 580, and with other elements or units of the policy enforcement node 50. The at least one memory 560 may comprise volatile and/or non-volatile memory. In particular, the at least one memory 560 may have a computer program 564 and data 568 stored therein. The computer program 564 may be loaded in the at least one memory 560 from a computer program product 550, such as any non-transitory computer readable medium, in which the computer program is stored. The data 568 may comprise any one of the control rules, bearer identifiers, rule instance identifiers and associations thereof. The at least one processor 570 may be configured to carry out the functions of the instance handler 573, the rule handler 575 and the bearer handler 577.

In accordance with an embodiment illustrated on FIG. 6, the AF node 60 may comprise at least one processor 620, and at least one memory 610 that stores processor-executable instructions 614. In this AF node, the at least one processor interfaces with the at least one memory to execute the processor-executable instructions, whereby the AF node is operable to perform the actions disclosed in the following.

The AF node is thus operable to transmit, to a policy control server 40 via a transmitter 630, one or more AF session establishment or modification requests with respective one or more media component descriptions, and with a media component instance identifier for each media component description; associate each transmitted media component instance identifier with the corresponding media component description; receive, from the policy control server via a receiver 640, a report indicating a resource allocation result and a media component instance identifier; and identify the media component description associated with the received media component instance identifier and for which the received resource allocation result applies.

In an embodiment, the report received from the policy control server 40 may also indicate an identifier of an IP flow affected by the resource allocation result, and the AF node may further be operable to identify the affected IP flow.

In particular, a session handler 624 running in a processor 620 may handle the transmission of each AF session establishment or modification request with a media component description and a media component instance identifier, and the reception of the report indicating the resource allocation result and the media component instance identifier. The session handler 624 or the processor itself may be in charge of handling procedures affecting each AF session.

Also in particular, a component handler 626 running in a processor 620 may handle media component descriptions for corresponding media components; and an instance handler 628 running in a processor 620 may associate each transmitted media component instance identifier with the corresponding media component description.

Upon receiving from the policy control server 40 the report indicating the resource allocation result and a media component instance identifier, the instance handler 628 may determine a media component description associated with the received media component instance identifier, and identify to the component handler 626 the associated media component description; and the component handler 626 may identify to the session handler 624 the media component description and media component for which the received resource allocation result applies.

In an embodiment wherein the report received from the policy control server 40 indicates the identifier of the IP flow affected by the resource allocation result, the component handler may identify the affected IP flow.

If required at all, the AF node 60 may be complemented with a data section 618 in memory to store any one of the media component descriptions, media component instance identifiers, AF sessions data, IP flows data and associations thereof.

The AF node 60 illustrated in FIG. 6 may thus comprise the at least one processor 620 and the at least one memory 610, both in communication with each other, with the session handler 624, the component handler 626, the instance handler 628, the receiver 640 and the transmitter 630, and with other elements or units of the AF node 60. The at least one memory 610 may comprise volatile and/or non-volatile memory. In particular, the at least one memory 610 may have a computer program 614 and data 618 stored therein. The computer program 614 may be loaded in the at least one memory 610 from a computer program product 600, such as any non-transitory computer readable medium, in which the computer program is stored. The data 618 may comprise any one of the media component descriptions, media component instance identifiers, AF sessions data, IP flows data and associations thereof. The at least one processor 620 may be configured to carry out the functions of the session handler 624, the component handler 626 and the instance handler 628.

In accordance with another embodiment illustrated on FIG. 10, the policy control server 40 may comprise a component handler 424 configured to receive, from an AF node 60 via a receiver 430, one or more AF session establishment or modification requests with respective one or more media component descriptions, and with a media component instance identifier for each media component description; a rule handler 428 configured to determine control rules for each received media component description; an instance handler 426 configured to associate each received media component instance identifier with rule instance identifiers for the determined control rules; and any one of the rule handler 428 and the instance handler 426 may be configured to control the transmitter 440 to transmit, to a policy enforcement node 50, the control rules and respective rule instance identifiers, for each media component description. For the sake of clarity, each control rule includes a control rule name distinguishable from the rule instance identifiers.

Further, upon receiving from the policy enforcement node 50 via the receiver 430, the report indicating a resource allocation result, a control rule name for an affected control rule and a rule instance identifier, the instance handler 426, likely in cooperation with the rule handler 428, may be configured to determine a media component instance identifier associated with the received rule instance identifier for the affected control rule; any one of the rule handler 428 and the instance handler 426 may be configured to provide the resource allocation result and the determined media component instance identifier to the component handler 424; and the component handler 424 may be configured to control the transmitter 440 to transmit, to the AF node 60, the report indicating the resource allocation result and the determined media component instance identifier.

In an embodiment, the instance handler 426, likely in cooperation with the rule handler 428, may be configured to determine an IP flow associated with the received control rule name and affected by the resource allocation result; any one of the rule handler 428 and the instance handler 426 may be configured to provide an identifier of the IP flow affected by the resource allocation result to the component handler 424; and the report, transmitted from the component handler 424 to the AF node, may also indicate the identifier of the IP flow affected by the resource allocation result.

In accordance with another embodiment illustrated on FIG. 11, the policy enforcement node 50 may comprise a rule handler 575 configured to receive, from a policy control server 40 via a receiver 590, a number of control rules and a respective rule instance identifier for each control rule, wherein each control rule includes a control rule name; an instance handler 573 configured to associate each received rule instance identifier with a corresponding control rule; and a bearer handler 577 configured to associate each received rule instance identifier with a bearer for which the corresponding control rule is to be installed or modified, and trigger a resource allocation procedure for the bearers for which the corresponding control rules are to be installed or modified. In particular, the resource allocation procedure may correspond to an establishment of a new bearer or a modification of an established bearer.

Further, upon obtaining a resource allocation result for a bearer via the receiver 590, the bearer handler 577 may be configured to determine a rule instance identifier associated with the bearer and identify to the instance handler 573 this rule instance identifier associated with the bearer; the instance handler 573 may be configured to determine a control rule associated with the identified rule instance identifier, this control rule being affected for the bearer, and identify to the rule handler 575 the identified rule instance identifier and the affected control rule; and the rule handler 575 may be configured to transmit, to the policy control server via a transmitter 580, a report indicating the resource allocation result, the control rule name of the affected control rule, and the rule instance identifier associated with the bearer.

In an embodiment, the rule handler 575 may be configured to determine the bearer for which the control rules are to be installed or modified.

In an embodiment, the instance handler 573 may be configured to associate each received rule instance identifier with the control rule name for the corresponding control rule and identify to the rule handler 575 the control rule name of the corresponding control rule, and the rule handler 575 may be configured to determine, based on the identified control rule name, a control rule affected for the bearer.

In accordance with another embodiment illustrated on FIG. 12, the AF node 60 may comprise a session handler 624 configured to transmit, to a policy control server 40 via a transmitter 630, one or more AF session establishment or modification requests with respective one or more media component descriptions and with a media component instance identifier for each media component description, and configured to receive, from the policy control server via a receiver 640, a report indicating a resource allocation result and a media component instance identifier; a component handler 626 may be configured to handle media component descriptions for corresponding media components; and an instance handler 628 may be configured to associate each transmitted media component instance identifier with the corresponding media component description.

Upon receiving from the policy control server 40 the report indicating the resource allocation result and a media component instance identifier, the instance handler 628 may be configured to determine a media component description associated with the received media component instance identifier, and identify to the component handler 626 the associated media component description; and the component handler 626 may be configured to identify to the session handler 624 the media component description and media component for which the received resource allocation result applies. The session handler 624 may be configured to handle procedures affecting each AF session.

In an embodiment, the report received at the session handler 624, from the policy control server 40, may also indicate an identifier of an IP flow affected by the resource allocation result. In this embodiment, the component handler 626 may be configured to identify the affected IP flow for which the received resource allocation result applies.

In the following, exemplary embodiments are discussed regarding possible amendments to be made on the currently existing information elements exchanged between the policy control server 40, the policy enforcement node 50 and the AF node.

In particular, as commented above, the policy control server 40 may be a network node implementing a PCRF 1 of the PCC architecture, the policy enforcement node 50 may be a network node implementing any one of a PCEF 2 and BBERF 9 of the PCC architecture, and the AF node may be a network node implementing an AF 5 of the PCC architecture; and the possible amendments discussed in the following affect information elements exchanged through the Rx, Gx and Gxx reference points.

In an embodiment, the media component description is currently used to convey the service information related to a media component, e.g. audio, video, from the AF to the PCRF over the Rx reference point, and is transmitted with a so-called Media-Component-Description attribute value pair (AVP). This information element may be extended to include the media component (MC) instance identifier in terms of an MC-Instance AVP, as follows:

```
Media-Component-Description ::= < AVP Header: 517 >
    { Media-Component-Number } ; Ordinal number of the media
      comp.
    *[ Media-Sub-Component ]  ; Set of flows for one flow identifier
    [ AF-Application-Identifier ]
    [ Media-Type ]
    [ Max-Requested-Bandwidth-UL ]
    [ Max-Requested-Bandwidth-DL ]
    [ Max-Supported-Bandwidth-UL ]
    [ Max-Supported-Bandwidth-DL ]
    [ Min-Desired-Bandwidth-UL ]
    [ Min-Desired-Bandwidth-DL ]
    [ Min-Requested-Bandwidth-UL ]
    [ Min-Requested-Bandwidth-DL ]
    [ MC-Instance ]
    [ Flow-Status ]
    [ Reservation-Priority ]
    [ RS-Bandwidth ]
    [ RR-Bandwidth ]
    *[ Codec-Data ]
    [ Sharing-Key-DL ]
    [ Sharing-Key-UL ]
    *[ AVP ]
```

In an embodiment, the Flows AVP is used over the Rx reference point so that the PCRF informs the AF about the status of the IP flows related to the indicated media component. This information element may be extended to include the MC-Instance AVP, as follows:

```
Flows::= < AVP Header: 510 >
    {Media-Component-Number}
    * [Flow-Number]
    [Final-Unit-Action]
    [ MC-Instance ]
```

In an embodiment, the Charging-Rule-Definition AVP is used over the Gx reference point to transmit from the PCRF to the PCEF information related to a PCC rule. This information element may be extended to include the Rule-Instance AVP as follows (a similar impact would apply to the QoS-Rule-Definition AVP when a QoS rule is transmitted from the PCRF to the BBERF over the Gxx reference point):

```
Charging-Rule-Definition ::= < AVP Header: 1003 >
    { Charging-Rule-Name }
    [ Service-Identifier ]
    [ Rating-Group ]
    *[ Flow-Information ]
    [ TDF-Application-Identifier ]
    [ Flow-Status ]
    [ QoS-Information ]
    [ PS-to-CS-Session-Continuity ]
    [ Reporting-Level ]
    [ Online ]
    [ Offline ]
    [ Metering-Method ]
    [ Precedence ]
    [ AF-Charging-Identifier ]
    *[ Flows ]
    [ Monitoring-Key]
    [ Redirect-Information ]
    [ Mute-Notification ]
    [ AF-Signalling-Protocol ]
    [ Sponsor-Identity ]
    [ Application-Service-Provider-Identity ]
    *[ Required-Access-Info ]
    [ Sharing-Key-DL ]
    [ Sharing-Key-UL ]
    [ Traffic-Steering-Policy-Identifier-DL ]
    [ Traffic-Steering-Policy-Identifier-UL ]
    [ Rule-Instance ]
    *[ AVP ]
```

In an embodiment, the Charging-Rule-Report AVP is used to report the status of a PCC rule from the PCEF to the PCRF over the Gx reference point. This information element may be extended to indicate the applicable Rule-Instance. In that case, one Charging-Rule-Report is provided for each PCC rule. Other possibilities are feasible, e.g. including the Rule-Instance as part of the Charging-Rule-Name AVP or including the charging rule name as part of the Rule-Instance AVP. A similar approach may apply to a QoS-Rule-Report AVP for a QoS rule transmitted from the BBERF to the PCRF over the Gxx reference point. In this embodiment, the Charging-Rule-Report AVP may be amended as follows:

```
Charging-Rule-Report ::= < AVP Header: 1018 >
    *[ Charging-Rule-Name ]
    *[ Charging-Rule-Base-Name ]
    [ Bearer-Identifier ]
    [ PCC-Rule-Status ]
    [ Rule-Failure-Code ]
    [ Final-Unit-Indication ]
    *[ RAN-NAS-Release-Cause ]
    [ Rule-Instance ]
    *[ AVP ]
```

The MC-Instance AVP disclosed above is a new AVP that identifies univocally an instance of a media component. The AF generates an MC-Instance when media component information needs to be sent over the Rx reference point, i.e. whenever the AF needs to allocate resources for a media component. The MC-Instance AVP may be a string generated randomly or, to avoid race conditions, may include a timestamp that indicates the time when the MC-Instance was generated.

The Rule-Instance AVP disclosed above is a new AVP that identifies univocally an instance of a PCC Rule (or QoS rule). The PCRF generates a Rule-Instance each time a PCC rule (or QoS rule) that has to be provisioned over the Gx reference point (or over the Gxx reference point) is related to a media component instance identified by an MC-Instance AVP. The Rule-Instance AVP may be a string generated randomly or, to avoid race conditions, may include a timestamp that indicates the time when the Rule-Instance was generated.

In embodiments for an AF, whenever the AF needs to initiate or modify an AF session over the Rx reference point, wherein the AF session includes the initial provision or the modification of media component information, the AF may include the MC-Instance AVP as part of the Media-Component-Description AVP. Additionally, it may subscribe to INDICATION_OF_SUCCESSFUL_RESOURCES_ALLOCATION and/or INDICATION_OF_FAILED_RESOURCE_ALLOCATION within the so-called Specific-Action AVP as per current procedures, in order to be notified about the outcome of the resource allocation.

Then, whenever the AF receives information about the outcome of the resource allocation, i.e. it receives the related specific actions within the Specific-Action AVP and the affected flows within the Flows AVP, the AF may check the MC-Instance AVP included within the Flows AVP. The AF may correlate the received MC-Instance with an MC-Instance previously provided by the AF to the PCRF and, even if more than one MC-Instance was provided for a same media component, the AF is able to identify univocally the affected media component information, i.e. it is able to know the outcome of the resource allocation for each provision or modification of media component information. Apart from that, the AF is able to deduct which reported MC-Instance is relevant at that moment and disregard any report related to previous service creation/modification interactions. Including a timestamp as part of the MC-Instance helps the AF to make this decision.

In embodiments for a PCRF, whenever the PCRF receives an AF session initiation or modification request, from the AF over Rx reference point, including an initial provision or modification of media component information, and including a MC-Instance AVP as part of the Media-Component-Description AVP, the PCRF may derive applicable PCC rule(s) and generate a Rule-Instance AVP for each PCC rule related to the media component, and associates the Rule-Instances for the applicable PCC rule(s) with the MC-Instance. The PCRF provisions these applicable PCC Rule(s) including the Rule-Instance AVP as part of the Charging-Rule-Description AVP for each PCC rule. Additionally, if INDICATION_OF_SUCCESSFUL_RESOURCES_ALLOCATION is subscribed by the AF with the Specific-Action AVP over Rx reference point, the PCRF may subscribe to SUCCESSFUL_RESOURCE_ALLOCATION Event-Trigger AVP over Gx reference point, as per current procedures.

Upon receiving a SUCCESSFUL_RESOURCE_ALLOCATION Event-Trigger AVP, at the PCRF from the PCEF over Gx reference point, including the Charging-Rule-Report AVP(s) with the Rule-Instance AVP(s) corresponding to the affected PCC rules, the PCRF may find the MC-Instance(s) related to the affected PCC Rule(s) and report INDICATION_OF_SUCCESSFUL_RESOURCES_ALLOCATION to the AF in a Specific-Action AVP and the Flows AVP including the MC-Instance AVP.

Likewise, if INDICATION_OF_FAILED_RESOURCES_ALLOCATION is subscribed by the AF with the Specific-Action AVP over Rx reference point, the PCRF may subscribe to FAILED_RESOURCE_ALLOCATION Event-Trigger AVP over Gx reference point, as per current procedures. When the PCRF receives an error over Gx with a Charging-Rule-Report AVP for each affected PCC rules and including the Rule-Instance AVP corresponding to the affected PCC rule, the PCRF may find the MC-Instance associated with Rule-Instance AVP for the affected PCC Rule(s) and may report to the AF the INDICATION_OF_FAILED_RESOURCES_ALLOCATION within a Specific-Action AVP and the Flows AVP including the MC-Instance AVP.

In embodiments for a PCEF, whenever the PCEF receives from the PCRF a Charging-Rule-Definition AVP for a PCC rule and including a Rule-Instance AVP and if the PCRF subscribed to SUCCESSFUL_RESOURCE_ALLOCATION, once the related bearer procedure is concluded successfully, the PCEF notifies the PCRF of the successful resource allocation with a Charging-Rule-Report indicating the affected PCC Rule and the Rule-Instance AVP.

On the other hand, whenever the PCEF receives from the PCRF a Charging-Rule-Definition AVP for a PCC rule and including a Rule-Instance AVP, if a related bearer procedure was not successful, the PCEF notifies the PCRF of a failure cause with a Charging-Rule-Report indicating the affected PCC Rule and the Rule-Instance AVP.

Then, if the PCEF has successfully installed a PCC rule related to a Rule-Instance AVP and further receives a modification of the same PCC Rule with a Rule-Instance AVP that is older than the one related to the installed PCC rule, the PCEF may discard the new request without initiating any bearer procedure.

In embodiments for a BBERF, a similar logic applies as for the PCEF, but replacing the AVP names related to PCC rules by AVP names related to QoS rules.

In the following, some exemplary use cases are disclosed and apply in an IP Multimedia Subsystem (IMS) deployment, wherein a P-CSCF (which behaves as AF) sends service information to the PCRF, upon receiving every SIP message that includes an SDP answer payload, for the purpose of authorizing the IP flows and the QoS resources required for a negotiated IMS session.

In the context of mission critical communication services (MCPTT) over LTE, a dispatch officer elevates the role of a Public Safety officer to become an incident leader, which results in elevated QoS characteristics. The AF modifies the service information with a higher Reservation-Priority AVP, and the PCRF provisions the updated QoS information to the PCEF. Almost simultaneously, the incident leader moves to an area where the QoS characteristics should be associated to a higher priority treatment. A Mobility Management Entity (MME) or an evolved Node B (eNB) modifies a dedicated bearer properly according to the QoS demand as required for the incident leader. However, it fails to establish or modify the dedicated bearer with the higher ARP and QCI related to the new location. In this case, the AF is informed by the PCRF that the QoS characteristics could not be granted. The AF can find out, based on the MC-Instance proposed in this invention, what QoS characteristics are finally accepted and the AF informs MCPTT application, which in turn informs the dispatch officer.

A new IMS application is started and it is added to an existing Media-Component. The P-CSCF (AF) modifies the service information with an additionally required bitrate and the PCRF provisions the updated QoS information to the PCEF. However, the MME/eNB fails to fulfil the modification request due to lack of resources, for example, due to radio congestion. In this case, the P-CSCF is informed by the PCRF that the additional bandwidth cannot be granted, and the P-CSCF can reject the establishment of the IMS application.

The invention may also be practised by a computer program, loadable into an internal memory of a computer with input and output units as well as with a processing unit. This computer program comprises executable code adapted to carry out the above method steps when running in the computer. In particular, the executable code may be recorded in a carrier readable means in a computer.

As used throughout the present specification, the word "comprising" does not exclude the presence of other elements or steps than those listed and the words "a" or "an" preceding an element do not exclude the presence of a plurality of such elements.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of reporting a resource allocation result when resource request and resource modifications occur in fast succession, the method carried out at a policy control server and comprising:
  receiving, from an application function, AF, node, one or more AF session establishment or modification requests with respective one or more media component descriptions, and with a media component instance identifier for each media component description;
  associating each media component instance identifier with rule instance identifiers for control rules determined for the corresponding media component description, wherein each control rule includes a control rule name;
  transmitting, to a policy enforcement node, the control rules and respective rule instance identifiers, for each media component description;
  receiving, from the policy enforcement node, a report indicating a resource allocation result, a control rule name for an affected control rule and a rule instance identifier;
  determining a media component instance identifier associated with the received rule instance identifier for the affected control rule; and
  transmitting, to the AF node, a report indicating the resource allocation result and the determined media component instance identifier.

2. The method of claim 1, wherein successive rule instance identifiers are generated at the policy control server with sequenced values.

3. The method of claim 2, wherein further reports received for a control rule, with previous rule instance identifiers than a last rule instance identifier in a previously received report, are ignored.

4. The method of claim 1, wherein the policy control server is a network node implementing a Policy and Charging Rules Function.

5. The method of claim 1, further comprising determining an IP flow associated with the received control rule name and affected by the resource allocation result; and wherein the report, transmitted to the AF node, also indicates an identifier of the IP flow affected by the resource allocation result.

6. A method of reporting a resource allocation result when resource request and resource modifications occur in fast succession, the method carried out at a policy enforcement node and comprising:
  receiving, from a policy control server, a number of control rules and a respective rule instance identifier for each control rule, wherein each control rule includes a control rule name;
  associating each rule instance identifier with a corresponding control rule and with a bearer for which the corresponding control rule is to be installed or modified;
  triggering a resource allocation procedure for each bearer for which the corresponding control rule is to be installed or modified;
  upon obtaining a resource allocation result for a bearer, determining the rule instance identifier associated with the bearer and a control rule affected for the bearer; and
  transmitting, to the policy control server, a report indicating the resource allocation result, the control rule name of the affected control rule, and the rule instance identifier associated with the bearer.

7. The method of claim 6, wherein the resource allocation procedure corresponds to an establishment of a new bearer or a modification of an established bearer.

8. The method of claim 6, wherein the policy enforcement node is a network node implementing a Policy and Charging Enforcement Function and the control rules are Policy and Charging Control, PCC, rules.

9. The method of claim 6, wherein the policy enforcement node is a network node implementing a Bearer Binding and Event Reporting Function and the control rules are Quality of Service, QoS, rules.

10. A method of reporting a resource allocation result when resource request and resource modifications occur in fast succession, the method carried out at an application function, AF, node and comprising:

determining that one or more new media components are required for a session;

generating a media component identifier for each media component description associated with the one or more new media components:

transmitting, to a policy control server, one or more AF session establishment or modification requests with the respective one or more media component descriptions, and with each media component instance identifier for each media component description associated with the one or more new media components;

associating each transmitted media component instance identifier with the corresponding media component description;

receiving, from the policy control server, a report indicating a resource allocation result and a media component instance identifier; and identifying the media component description associated with the received media component instance identifier and for which the received resource allocation result applies.

11. The method of claim 10, wherein successive media component instance identifiers are generated at the AF node with sequenced values.

12. The method of claim 11, wherein further reports received for a media component description, with previous media component instance identifiers than a last media component instance identifier in a previously received report, are ignored.

13. The method of claim 10, wherein the report, received from the policy control server, also indicates an identifier of an IP flow affected by the resource allocation result, and the method further comprises identifying the affected IP flow.

14. A policy control server for providing control rules to be enforced at a policy enforcement node for resource allocation, and for reporting to an application function, AF, node a resource allocation result, the policy control server comprising:

at least one processor; and at least one memory that stores processor-executable instructions, wherein the at least one processor interfaces with the at least one memory to execute the processor-executable instructions, whereby the policy control server is operable to:

receive, from an AF node via a receiver, one or more AF session establishment or modification requests with respective one or more media component descriptions, and with a media component instance identifier for each media component description;

associate each media component instance identifier with rule instance identifiers for control rules determined for the corresponding media component description, wherein each control rule includes a control rule name;

transmit, to a policy enforcement node via a transmitter, the control rules and respective rule instance identifiers, for each media component description;

receive, from the policy enforcement node via the receiver, a report indicating a resource allocation result, a control rule name for an affected control rule and a rule instance identifier;

determine a media component instance identifier associated with the received rule instance identifier for the affected control rule; and transmit, to the AF node via the transmitter, a report indicating the resource allocation result and the determined media component instance identifier.

15. The policy control server of claim 14, further operable to generate successive rule instance identifiers with sequenced values.

16. The policy control server of claim 15, further operable to ignore further reports received for a control rule, with previous rule instance identifiers than a last rule instance identifier in a previously received report.

17. The policy control server of claim 14, wherein the policy control server is a network node implementing a Policy and Charging Rules Function.

18. The policy control server of claim 14, further operable to determine an IP flow associated with the received control rule name and affected by the resource allocation result; and wherein the report, transmitted to the AF node, also indicates an identifier of the IP flow affected by the resource allocation result.

19. A policy enforcement node for enforcing control rules received from a policy control server for resource allocation, and for reporting to the policy control server a resource allocation result, the policy enforcement node comprising:

at least one processor; and at least one memory that stores processor-executable instructions, wherein the at least one processor interfaces with the at least one memory to execute the processor-executable instructions, whereby the policy enforcement node is operable to:

receive, from a policy control server via a receiver, a number of control rules and a respective rule instance identifier for each control rule, wherein each control rule includes a control rule name;

associate each rule instance identifier with a corresponding control rule and with a bearer for which the corresponding control rule is to be installed or modified;

trigger a resource allocation procedure for each bearer for which the corresponding control rule is to be installed or modified;

determine, upon obtaining a resource allocation result for a bearer, the rule instance identifier associated with the bearer and a control rule affected for the bearer; and transmit, to the policy control server via a transmitter, a report indicating the resource allocation result, the control rule name of the affected control rule, and the rule instance identifier associated with the bearer.

20. The policy enforcement node of claim 19, wherein the resource allocation procedure corresponds to an establishment of a new bearer or a modification of an established bearer.

21. The policy enforcement node of claim 19, wherein the policy enforcement node is a network node implementing a Policy and Charging Enforcement Function and the control rules are Policy and Charging Control, PCC, rules.

22. The policy enforcement node of claim 19, wherein the policy enforcement node is a network node implementing a Bearer Binding and Event Reporting Function and the control rules are Quality of Service, QoS, rules.

23. An application function, AF, node for offering applications a control of bearer resources, and for receiving resource allocation results from a policy control server, the AF node comprising:

at least one processor; and at least one memory that stores processor-executable instructions, wherein the at least one processor interfaces with the at least one memory to execute the processor-executable instructions, whereby the AF node is operable to:

determine that one or more new media components are required for a session:
generate a media component identifier for each media component description associated with the one or more new media components:
transmit, to a policy control server via a transmitter, one or more AF session establishment or modification requests with the respective one or more media component descriptions, and with each media component instance identifier for each media component description associated with the one or more new media components;
associate each transmitted media component instance identifier with the corresponding media component description;
receive, from the policy control server via a receiver, a report indicating a resource allocation result and a media component instance identifier; and identify the media component description associated with the received media component instance identifier and for which the received resource allocation result applies.

24. The AF node of claim 23, further operable to generate successive media component instance identifiers with sequenced values.

25. The AF node of claim 24, further operable to ignore further reports received for a media component description, with previous media component instance identifiers than a last media component instance identifier in a previously received report.

26. The AF node of claim 23, wherein the report, received from the policy control server, also indicates an identifier of an IP flow affected by the resource allocation result, and the AF node is further operable to identify the affected IP flow.

* * * * *

UNITED STATES PATENT AND TRADEMARK OFFICE
CERTIFICATE OF CORRECTION

PATENT NO.         : 10,893,443 B2
APPLICATION NO.    : 16/309681
DATED              : January 12, 2021
INVENTOR(S)        : Rivas Molina et al.

It is certified that error appears in the above-identified patent and that said Letters Patent is hereby corrected as shown below:

On the Title Page

In Item (57), under "ABSTRACT", in Column 2, Line 20, delete "allocation applies." and insert -- allocation result applies. --, therefor.

In the Specification

In Column 9, Lines 57-58, delete "Subscription Profile Repository (SPR) 1," and insert -- Subscription Profile Repository (SPR) 3, --, therefor.

In Column 15, Line 49, delete "illustrated on" and insert -- illustrated in --, therefor.

In Column 17, Line 22, delete "illustrated on" and insert -- illustrated in --, therefor.

In Column 18, Line 39, delete "illustrated on" and insert -- illustrated in --, therefor.

In Column 19, Line 49, delete "illustrated on" and insert -- illustrated in --, therefor.

In Column 20, Line 27, delete "illustrated on" and insert -- illustrated in --, therefor.

In Column 21, Line 1, delete "illustrated on" and insert -- illustrated in --, therefor.

In Column 23, Lines 44-45, delete "INDICATION_OF_FAILED_RESOURCE_ALLOCATION" and insert -- INDICATION_OF_FAILED_RESOURCES_ALLOCATION --, therefor.

In Column 25, Lines 3-4, delete "mission critical communication services (MCPTT)" and insert -- Mission Critical Push-To-Talk (MCPTT) communication services --, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*

In the Claims

In Column 27, Line 5, in Claim 10, delete "components:" and insert -- components; --, therefor.

In Column 29, Line 2, in Claim 23, delete "session:" and insert -- session; --, therefor.

In Column 29, Line 5, in Claim 23, delete "components:" and insert -- components; --, therefor.